«12» United States Patent
Kardokas

(10) Patent No.: US 8,655,777 B2
(45) Date of Patent: Feb. 18, 2014

(54) MERCHANT PERFORMANCE RATING FOR PAYMENTS ON ACCOUNT

(75) Inventor: Laima Kardokas, Emerald Hills, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 584 days.

(21) Appl. No.: 12/595,501

(22) PCT Filed: Apr. 11, 2008

(86) PCT No.: PCT/US2008/060118
§ 371 (c)(1),
(2), (4) Date: Jan. 29, 2010

(87) PCT Pub. No.: WO2008/128108
PCT Pub. Date: Oct. 23, 2008

(65) Prior Publication Data
US 2010/0145788 A1 Jun. 10, 2010

Related U.S. Application Data

(60) Provisional application No. 60/911,491, filed on Apr. 12, 2007.

(51) Int. Cl.
*G06Q 40/00* (2012.01)
(52) U.S. Cl.
USPC .................................. 705/40; 705/34; 705/44
(58) Field of Classification Search
USPC .............................................. 705/34, 40, 44
See application file for complete search history.

(56) References Cited

U.S. PATENT DOCUMENTS

| 5,765,138 | A  | * | 6/1998  | Aycock et al. ................ 705/7.23 |
| 5,970,475 | A  | * | 10/1999 | Barnes et al. ............... 705/26.35 |
| 6,343,275 | B1 |   | 1/2002  | Wong |
| 7,831,463 | B2 | * | 11/2010 | Nagar ........................... 705/7.38 |
| 2003/0014326 | A1 | * | 1/2003 | Ben-Meir et al. ................ 705/26 |
| 2005/0080728 | A1 |   | 4/2005  | Sobek |

(Continued)

FOREIGN PATENT DOCUMENTS

| JP | 2006-244324 | 9/2006 |
| KR | 10-2006-0039311 | 5/2006 |
| WO | 01/28188 | 4/2001 |
| WO | 2006/085885 | 8/2006 |

OTHER PUBLICATIONS

Chuck Cogar and Melaine Sisler, "Citibank and Visa," Sep. 1, 2005, pp. 1-46.*

(Continued)

*Primary Examiner* — Kenneth Bartley
(74) *Attorney, Agent, or Firm* — Loeb & Loeb LLP

(57) ABSTRACT

A business derives its cost to pay accounts payable (AJP) with a corporate card versus other payment methods. The business identifies each merchant to whom the business owes AJP who but does not accept the corporate card. A weighting factor is derived for each such merchant from costs of paying with and without the corporate card, as well as from its history of past payments to the merchant. The benefit to the business is derived, using the corresponding weighting factor, for each such merchant in paying the corresponding AJP to the merchant with the corporate card. Where the benefit exceeds a predetermined threshold, information is sent to each such merchant sufficient for the merchant to receive payment of the corresponding AJP with the corporate card.

19 Claims, 25 Drawing Sheets

(56) References Cited

U.S. PATENT DOCUMENTS

| | | | |
|---|---|---|---|
| 2006/0053063 A1* | 3/2006 | Nagar | 705/26 |
| 2007/0061260 A1 | 3/2007 | deGroeve et al. | |
| 2007/0150323 A1* | 6/2007 | Lin et al. | 705/7 |
| 2007/0282743 A1* | 12/2007 | Lovelett et al. | 705/40 |
| 2008/0071588 A1 | 3/2008 | Eder | |
| 2008/0091511 A1* | 4/2008 | Monin et al. | 705/10 |
| 2008/0288379 A1 | 11/2008 | Allin et al. | |
| 2010/0145788 A1 | 6/2010 | Kardokas | |

OTHER PUBLICATIONS

Joyce Heath, Martin Johnson, Valerie Mawdsley, "Citibank Presents: Program Optimization for the Purchase Card," Aug. 1, 2006, pp. 1-34.*

Visa Commercial, "Best Practices for Maximizing Commercial Card Program Performance," Mar. 2007, pp. 1-30.*

Visa Commercial Card, "Visa Commercial Card Best Practices," 2005, pp. 1-62.*

International Search Report and Written Opinion of the International Searching Authority for corresponding Application No. PCT/US2008/060118 dated Sep. 26, 2008.

International Searching Authority, "Search Report and Written Opinion," issued in connection with International Application No. PCT/US2009/067185, mailed on Jul. 27, 2010, 7 pages.

* cited by examiner

Select or specifcy a Process Cost Savings statistic

------------------------------------------------------------------------

Benchmark Cost Savings per Transaction  $1.23  }— 202

Calculate a client-specific Process Cost Savings statistic:

Step 1: Hourly Wages
Specify the Average Fully-Loaded Hourly Wages of the following resources End User
Approver of Order
Procurement                                          ◂— 204
Accounts Payable
Approver in Accounts Payable

Fig. 2

Step 2: Determine Ordering Costs
Please fill in the following order placement information.

Minutes to complete a paper requisition
Minutes to complete an electronic requisition                 ◂— 206
Percentage of the order for which Approvals are required
Minutes to approve a paper requisition
Minutes to approve an electronic requisition
Average number of paper based approvals
Average number of electronic based approvals
Minutes for the procurement to review a paper requisition
Minutes for the procurement to review an electronic requisition
Percentage of order for which new sourcing is required
Minutes to investigate new paper sourcing
Minutes to investigate new electronic sourcing
Minutes to finalize and enter a paper requisition into the purchase order
Minutes to finalize and enter an electronic requisition into the purchase order
Number of paper-based PO's issued per year
Number of electronic-based PO's issued per year

Step 3: Check Payment

Please enter information about your check payment process ← 302

Minutes to receive and sort each invoice for processing
    Minutes to enter each invoice into the Accounts Payable system
    Minutes to match invoice with order and receipt
    Percentage of orders for which investigation is required prior to payment
    Minutes to investigate an invoice
    Percentage of payments for which Approvals are required
    Minutes to approve a payment
    Average number of approvals required
    Minutes to send payment to the supplier
    Check Payment is outsourced    Fee per check is: [    ] } 304

*Total payment cost*  [ 0.00 ]

Step 4: Card Purchase and Payment

Please enter your card purchase and payment information. ← 308

Percentage of purchase orders required for card purchase
    Minutes to order an item, provide card information and log purchase
    Minutes to receive statement, reconcile cost centers & GA's, and organize receipts
    Percentage of payments for which approvals are required
    Minutes to approve statement
    Average number of approvals required
    Minutes to pay statement
    Monthly transaction estimate per cardholder

← 310

*Total Card Purchase and Payment Cost*  [ 0.00 ]

Fig. 3b

Monthly purchasing card spend

Monthly spend per cardholder

Monthly transactions per card

Average transaction size

Cardholder-to-employee ratio

Percent of active cards in a typical month

Percent of transactions under $2,500 paid by purchasing card

Percent of transactions between $2,500 and $10,000 paid by purchasing card

Total Spend by Spend Category and Payment Method

Client Name: ABC Company
Spend Category Name: All
Visa Acceptor: All
Excluded Business Unit Name: None
Excluded Cost Center Name: None
Excluded Supplier Name: None

| Spend Category Name | ACH | | |
| --- | --- | --- | --- |
| | Annualized Spend Amount | No. of Trans | % of Spend Category |
| ADVERTISING | $2,626 | 12 | 0% |
| MRO | $666,914 | 1,389 | 2% |
| DIRECT MATERIALS | $529,368 | 1,460 | 10% |

\* \* \*     CARD

\* \* \*     \* \* \*

CHECK

\* \* \*     \* \* \*

EFT

\* \* \*     \* \* \*

WIRE TRANSFER

\* \* \*

Grand Total

Fig. 8

Cardable Spend by Spend Category and Policy Tier

| Cardable Payment Methods: | CHECK |
|---|---|
| Visa Acceptor: | Yes |

| Spend Category Name | $0 - $2500 | | |
|---|---|---|---|
| | Annualized Spend Amount | No. of Trans | % of Cardable Spend |
| MRO | $18,359,747 | 48,533 | 29% |

| $2500 - $5000 | | | $5000 - $20000 | | |
|---|---|---|---|---|---|
| Annualized Spend Amount | No. of Trans | % of Cardable Spend | Annualized Spend Amount | No. of Trans | % of Cardable Spend |
| $4,242,336 | 1,283 | 7% | $3,788,570 | 483 | 6% |

| Grand Total | | |
|---|---|---|
| Annualized Spend Amount | No. of Trans | % of Cardable Spend |
| $26,390,653 | 50,299 | 42% |

Fig. 9

Cardable Spend by Suppliers Who Accept Visa

| Annualized Spend Amount | No. of Trans | Avg. Tran Amount |
| --- | --- | --- |

Cardable Transactions by Suppliers Who Accept Visa

| Annualized Spend Amount | No. of Trans | Avg. Tran Amount |
| --- | --- | --- |

Fig. 10

Commercial Card Vs. Cardable Spend by Supplier — 1100

| CARD | | |
|---|---|---|
| Annualized Spend Amount | No. of Trans | Avg. Tran Amount |

| CARDABLE | | |
|---|---|---|
| Annualized Spend Amount | No. of Trans | Avg. Tran Amount |

Total Spend by Business Unit and Payment Method — 1102

| Business Unit Name |
|---|
| ABC CORPORATE |
| FINANCE DEPARTMENT |

| ACH | | CARD | |
|---|---|---|---|
| Annualized Spend Amount | % of BU Spend | Annualized Spend Amount | % of BU Spend |
| $356,393 | 2% | $1,613,453 | 11% |
| $277,577 | 2% | $1,500,444 | 10% |

| CHECK | | EFT | |
|---|---|---|---|
| Annualized Spend Amount | % of BU Spend | Annualized Spend Amount | % of BU Spend |
| $12,575,875 | 86% | | |
| $12,469,919 | 86% | $190,283 | 1% |

Fig. 11

Cardable Spend with Suppliers Who Do Not Currently Accept Visa

Supplier Name

PROFESSIONAL SCREEN PRINTING INC(*E)

| Annualized Spend Amount | No. of Trans |
|---|---|
| $402,254 | 35 |

| Avg. Tran Amount |
|---|
| $11,493 |

← 1200

← 1202

Cardable Transactions with Suppliers Who Do Not Currently Accept Visa

Supplier Name

PROFESSIONAL SCREEN PRINTING INC(*E)

| Annualized Spend Amount | No. of Trans | Avg. Tran Amount |
|---|---|---|
| $51,595 | 212 | $243 |

Potential Visa Commerce Suppliers by Spend Amount

Supplier Name

← 1204

PROFESSIONAL SCREEN PRINTING INC(*E)

| Annualized Spend Amount | No. of Trans | Avg. Tran Amount |
|---|---|---|
| $1,467,785 | 228 | $6,438 |

Fig. 12

Potential Visa Commerce Suppliers by Number of Transactions

| Supplier Name |
|---|
| PROFESSIONAL SCREEN PRINTING INC(*E) |

← 1300

| Annualized Spend Amount | No. of Trans | Avg. Tran Amount |
|---|---|---|
| $1,430,247 | 224 | $6,385 |

Supplier Reference ← 1302

| Visa Merchant |
|---|
| 3 BROTHERS WELDING MACHINE SHOP INC(*P) |
| 5000 ROLE MODELS OF EXCELLENCE(*P) |

| Visa Acceptor | Level II | Level III | Annualized Spend Amount | No. of Trans | Avg. Tran Amount |
|---|---|---|---|---|---|
| N | N | N | $3,273 | 24 | $136 |
| N | N | N | $17,661 | 12 | $1,472 |

| Cardable Spend | Commercial Card Spend | Spend via Other Payment Methods |
|---|---|---|
| $3,273 | $0 | $0 |
| $17,661 | $0 | $0 |

Fig. 13

Fig. 14

Financial Benefits Summary Report — 1500, 1502

| | |
|---|---|
| Total Projected Process Savings | $4,469,955 |
| Number of Additional Card Transactions: | 83,949 |
| Purchase & Payment Process Savings per Transaction: | $35.00 |
| Savings Opportunity (Number of Transactions x Process Savings): | $2,938,215 |
| Current Savings on Your Existing Card Program | $1,531,740 |
| Total Process Savings (Current Savings + Savings Opportunity) | $4,469,955 |

Commercial Card Expansion Return on Investment — 1504, 1506

ROI Analysis Input

| Policy Tier | Annualized Spend Amount | No. of Trans | Avg. Tran Amount |
|---|---|---|---|
| $0 - $2500 | $31,658,392 | 78,686 | $402 |
| $2500 - $5000 | $9,753,707 | 2,826 | $3,451 |
| $5000 - $20000 | $21,845,368 | 2,437 | $8,964 |
| Grand Total | $63,257,467 | 83,949 | $754 |

Working Capital Assumptions — 1508

| Check Days Payable | Card Days Payable | Short-Term Interest Rate |
|---|---|---|
| 30 | 20 | 5.0% |

Financial Assumptions — 1510

| Cost of Capital | Savings per Card Transaction |
|---|---|
| 12.0% | $35.00 |

Card Program Expansion Cost Overview — 1512

| Costs | Current Year |
|---|---|
| Implementation Costs | $5,000 |
| On-going Costs | $0 |
| Working Capital Costs | $0 |
| Total cost of Ownership | $5,000 |

Commercial Card Expansion Return on Investment — 1700

Estimated ROI (000s)

| Cash Flow Estimates (000s) | NPV | Current Year |
|---|---|---|
| Process Savings | | $1,534 |
| Total Costs | | ($5) |
| Net Process Savings | | $1,529 |
| Net Cash Flow | | $1,529 |
| Discounted Cash Flow | $10,045 | $1,529 |

Cardable Spend by Spend Category and Policy Tier — 1702

| Spend Category Name | Annualized Spend Amount | $0 - $2500 No. of Trans |
|---|---|---|
| MRO | $18,359,747 | 48,533 |
| ADVERTISING | $2,730,341 | 2,579 |
| DIRECT MATERIALS | $3,221,384 | 14,988 |
| FLEET | $2,451,481 | 3,827 |
| ★ ★ ★ | | |
| DUES & SUBSCRIPTIONS | $54,809 | |
| MEALS & ENTERTAINMENT | $44,083 | |
| Grand Total | $31,658,393 | |

Fig. 17

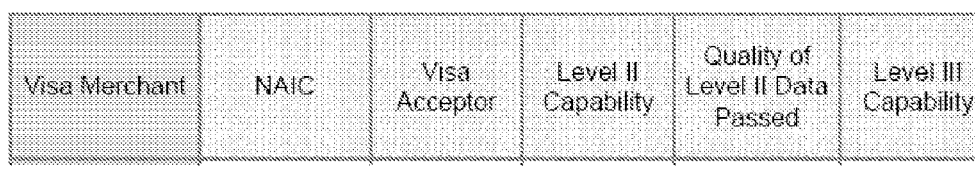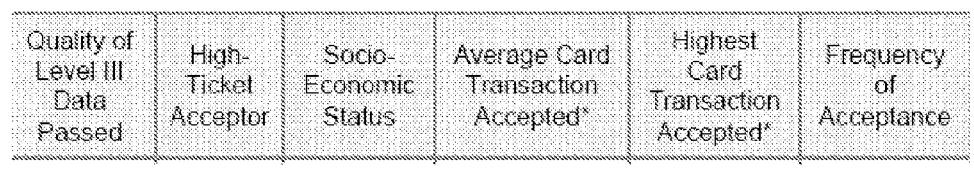
Fig. 18

MERCHANT PERFORMANCE RATING FOR PAYMENTS ON ACCOUNT

CROSS-REFERENCE TO RELATED APPLICATIONS

This application is a National Stage Entry of and claims priority under 35 U.S.C. §371 to PCT application PCT/US08/60118, which in turn claims priority to U.S. Provisional Application Ser. No. 60/911,491, titled "Payment Processing Industry Tool," filed Apr. 12, 2007, which is incorporated herein by reference.

COPYRIGHT

Contained herein are materials subject to copyright protection. The copyright owner has no objection to the facsimile reproduction of the patent disclosure by any person as it appears in the Patent and Trademark Office patent files or records, but otherwise reserves all rights to the copyright whatsoever.

FIELD

Various implementations, and combinations thereof, are related to tools useful in a payment processing industry, more particularly data analysis tools useful in a payment processing industry, and most particularly to data analysis tools that facilitate the optimization of an organization's payment processing program within at least one payment processing system.

BACKGROUND

Businesses often use checks and cash to pay suppliers, also known as merchants. These businesses do not have a low cost, easy way of comparing their financial performance of using a commercial card, such as a credit or debit card, to pay a merchant versus using cash or check to pay the merchant. Stated otherwise, these card holding businesses do not have a way of comparing the savings that they could realize from paying with a credit card or a corporate card as compared to suppliers dealing in goods and services of like categories.

It is desirable for a business to have a way of valuating the financial benefits of paying with a credit or debit card as opposed to paying with cash or checks. For instance, by eliminating a purchase order, an invoice and a check payment to a merchant, there is a concomitant reduction in processing activities and costs for paying bills to the merchant. A business that pays by corporate card, such by a credit card or debit card, can streamline its operations and reduce their soft and hard dollar expenses, as well as potentially increasing rebates paid back to the business from the issuer of the corporate card.

A company that can use a corporate card to pay its bills from merchants, as well as the bank that issues the company its corporate card, needs a way of deciding what is the best and most cost efficient way to design and implement a plan to change from paying its merchants with cash or checks to pay those merchants by credit cards or debit cards (i.e., corporate card).

A business needs a way of identifying which of the merchants that the company buys from will accept credit and debit cards as payment for the supplies that they sell to the business. Once these merchants are so identified, they can be ranked from highest to lowest in terms of what priority and what benefit might be realized by the business paying the merchant with a corporate card, such as a credit or debit card.

By rating each supplier according to the priority by which they should be paid by a debit or credit card, a company can streamline the processes that they pay those suppliers most efficiently, as well as identify opportunities to increase working capital that can be used to pay the suppliers, as well as identifying which of the business's suppliers are most appropriate for being paid by debit or credit card.

It would be an advantage in the art to provide analytical tools and services that will help businesses, as well as the banks that issue credit and debit accounts to those businesses, to improve and expand their programs for using debit and credit cards.

It would also be an advantage to the art to provide a tool by which a business could predict which of their suppliers would be most likely to accept debit and credit card payments.

It would further be an advance in the art to determine the savings that might be realized, and the return on investment that might be realized, by changing a business's policy of paying with cash and checks to a policy of paying certain of its suppliers with debit and credit cards.

SUMMARY

One implementation a business derives its cost to pay accounts payable (A/P) with a corporate card versus other payment methods. The business identifies each merchant to whom the business owes A/P who but does not accept the corporate card. A weighting factor is derived for each such merchant from costs of paying with and without the corporate card, as well as from its history of past payments to the merchant. The benefit to the business is derived, using the corresponding weighting factor, for each such merchant in paying the corresponding A/P to the merchant with the corporate card. Where the benefit exceeds a predetermined threshold, information is sent to each such merchant sufficient for the merchant to receive payment of the corresponding A/P with the corporate card.

In another implementation, for each merchant to whom a business account holder (A/H) owes accounts payable (A/P), where the A/H had not previously paid the merchant by an account of a corporate card (CC) issued to the A/H by an issuer, and where the merchant does not accept payments by the CC on the account, and for which the benefit to the A/H to pay the merchant the A/P by the CC on the account exceeds a predetermined threshold, a list is formed of each such merchant as an entry on a report of non-acceptors of payment by the CC on the account. A report is rendered on a user interface (UI) having input fields for each merchant to allow input to be received from a user. Data input is received in the input fields for one or more selected merchants on the report, where the received data for each selected merchant includes an incentive to the merchant to accept a payment from the A/H on by the CC on the account. A transmission is formed and includes data for delivery to each merchant having corresponding input from UI. This data includes a request to the merchant to accept a payment from the A/H on by the CC on the account and to accept the corresponding selected incentive for doing so. In response to the request from the A/H there is received an agreement for the merchant to accept the request. That agreeing merchant is authenticated for eligibility for to accept payment by the CC on the account and for receiving the selected incentive. In response to a positive authentication of the merchant's eligibility, information is transmitted for delivery to the authenticated merchant sufficient for the A/H to pay the A/P to the M by the CC on the account.

BRIEF DESCRIPTION OF THE DRAWINGS

Implementations of the invention will become more apparent from the detailed description set forth below when taken in conjunction with the drawings, in which like elements bear like reference numerals.

FIG. 2 is an exemplary user interface into which data entry is made;

FIG. 3A is an exemplary user interface for calculating business costs of paying with a check;

FIG. 3B is an exemplary user interface for calculating business costs of paying with credit cards;

FIG. 5 illustrates an exemplary information display for viewing business payment history;

FIG. 7 illustrates exemplary data tables demonstrating funds calculations;

FIG. 8 illustrates an exemplary abbreviated report of a company's total spending;

FIG. 9 illustrates exemplary tables demonstrating a company's cardable spending;

FIG. 10 illustrates an exemplary report of a company's cardable spending.

FIG. 11 illustrates an exemplary report of payments to suppliers;

FIG. 12 illustrates an exemplary report with suppliers who do not accept corporate card payments;

FIG. 13 illustrates an exemplary report illustrating potential suppliers that would accept a commercial card;

FIG. 14 illustrates an exemplary financial benefit summary report;

FIG. 15 illustrates an exemplary comprehensive report of the information provided in FIG. 14;

FIG. 16 illustrates an exemplary report demonstrating payments that can be paid with a corporate card;

FIG. 17 illustrates an exemplary commercial card expansion ROI report;

FIG. 18 illustrates an exemplary report containing information about suppliers;

DETAILED DESCRIPTION

Figure 1:
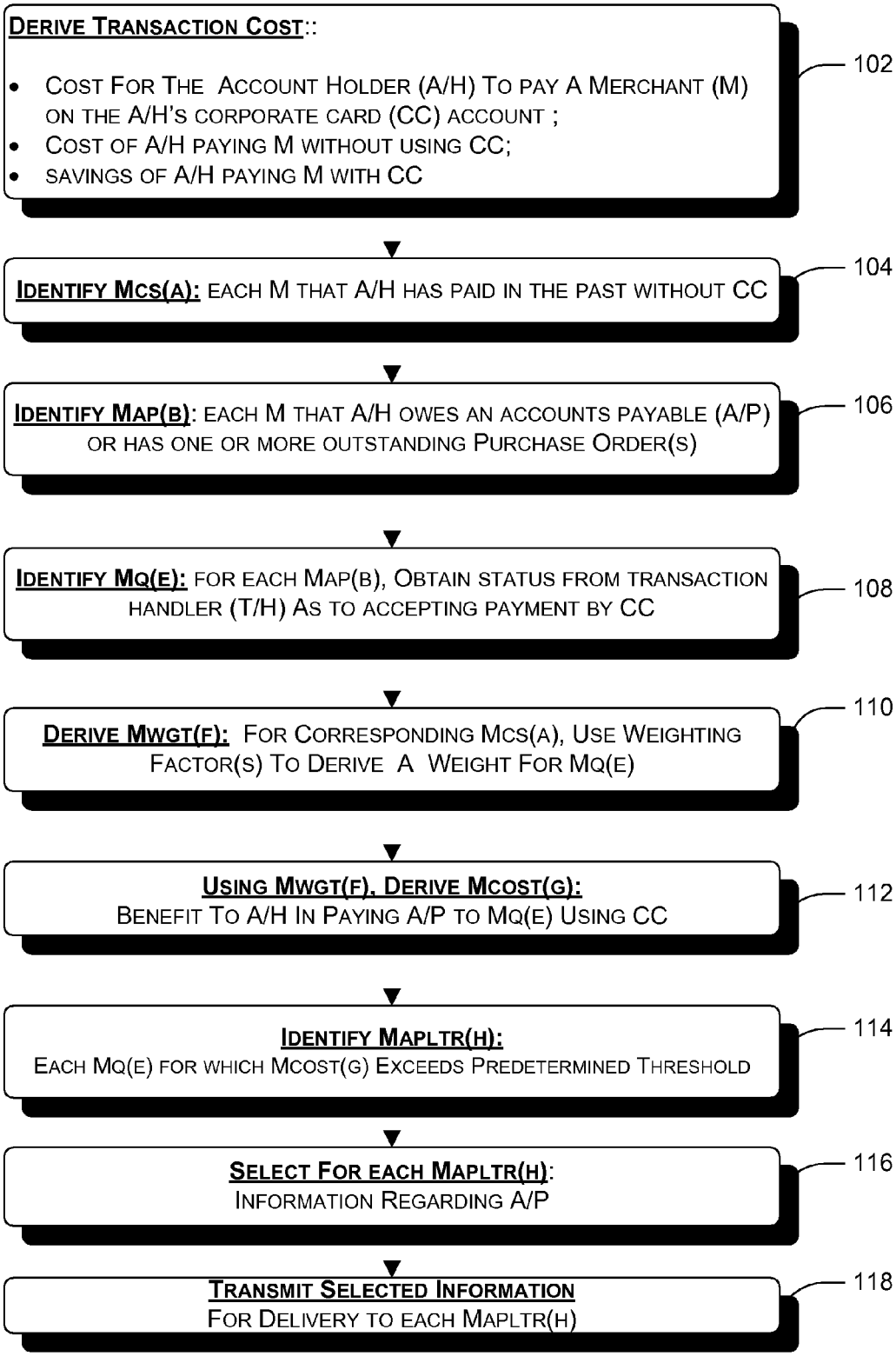
FIG. 1 is an exemplary process for implementing a program for a business to pay merchants on an account issuer to the business by an issuer.

FIG. 1 shows an exemplary process 100 for determining the relative merits of paying a supplier (i.e., a merchant) of goods and services to a business with a debit or credit card as opposed to paying the supplier to the business for goods and services using a check or cash.

Process 100 begins at step 102 where costs of the business in conducting a typical transaction are determined. In particular, the costs of a business paying a typical merchant with a corporate card, also known as a credit card or a debit card, are determined. Also determined are the costs of paying the typical merchant with cash or with a check. Finally, the savings that might be realized by the business paying the typical merchant with a credit or debit card, as opposed to cash or check, are derived. Step 102 corresponds to step 1902 seen in FIG. 19 and explained below.

After the determination of the costs and savings at step 102, process 100 moves to step 104. At step 104, an examination is made of merchants, also known as suppliers herein, that a business has paid over a particular past period of time where those payments have been made to the suppliers by the business without the benefit of paying with a corporate card (i.e., a debit or credit card). That is, merchants are identified that the business has paid in the past by using cash or checks. For each such merchant, a designation is made of Mcs(a), where the number of merchants Mcs can be an unlimited number by the variable (a) having a value from 1 to A.

As used herein, a lower case letter in parenthesis is intended to mean an integer variable having a value from 1 to the capital case of the lower case letter, which value can be large (i.e., approaching infinity). This (b) can have a value from 1 to B, (c) can have a value from 1 to C, etc.

Process 100 moves then to step 106 at which a determination is made as to the identification of each merchant that the business presently owes money to or will shortly make a purchase from by way of a purchase order or other such vehicle. Each such merchant is designated as Map(b).

Figure 23:
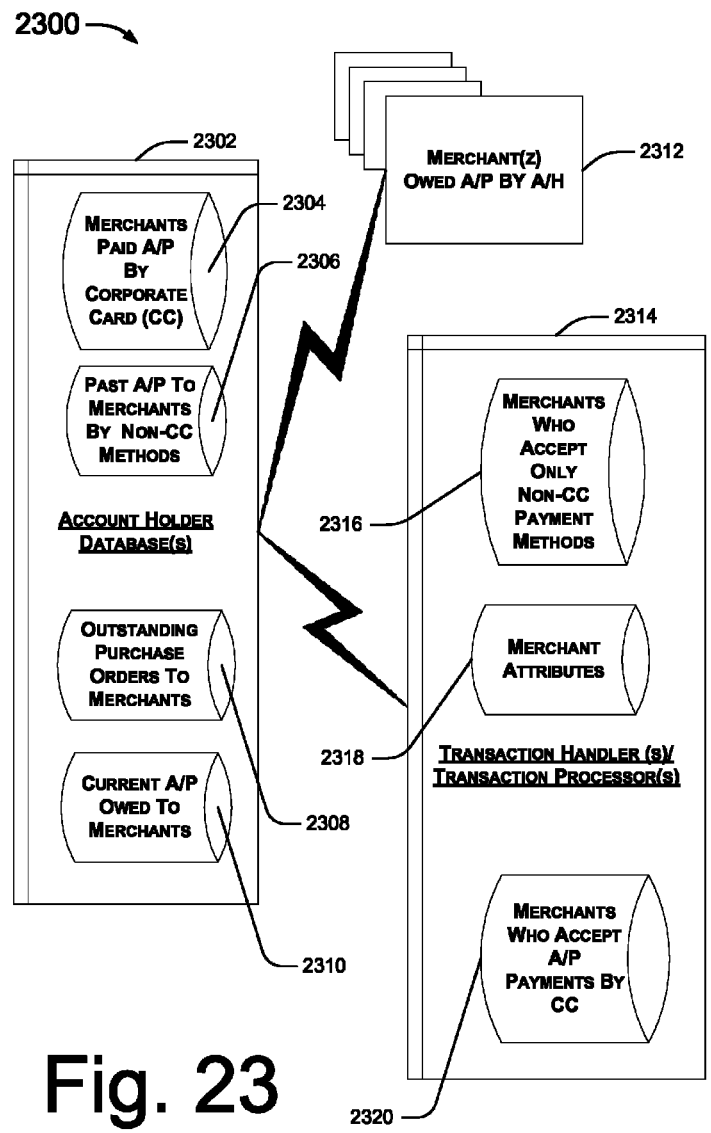
FIG. 23 illustrates an exemplary environment in which at least a part of the process of FIG. 1 can be implemented.

Process 100 moves to step 108 at which an identification is made of each merchant Mq(e) that will accept payment by corporate card. Here, this status of each merchant Mq(e) can be obtained from a transaction handler, a transaction processor, or an agent thereof. Step 108 can be implemented in an environment 2300 as depicted in FIG. 23 as explained below.

Process 100 moves to step 110 at which a derivation is made of one or more weighting factors (Mwgt(f)) for each merchant Mq(e) on the basis of past payments derived to that merchants as found from Mcs(a). Step 110 corresponds to step 2102 seen in FIG. 21 and explained below.

Process 100 moves to step 112 at which Mwgt(f) is used to derive Mcost(g), where Mcost(g) is the benefit that might be realized by the business or Account Holder (A/H) by paying a bill or Accounts Payable (A/P) owed to the merchant Mq(e) using the business's Corporate Card (CC).

Figure 24:
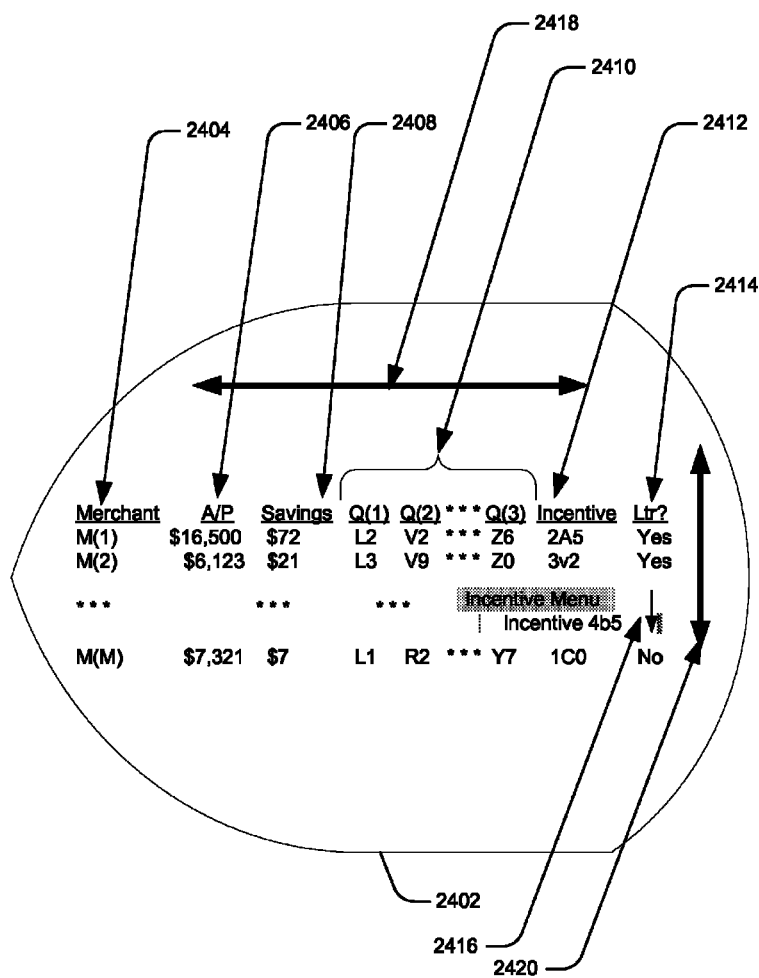
FIG. 24 depicts an exemplary user interface for displaying data of, and receiving data for, the processes of FIGS. 1 and 23.

Process 100 moves to step 114 at which a determination is made as to whether the realized benefit by paying the merchant Mq(e) by CC from step 112 exceed a predetermined threshold. If so, then merchant Mq(e) is added as merchant Mapltr(h). Steps 112-114 correspond to step 2202 seen in FIG. 22 as explained below. Also, and by way of non-limiting example, one or more such merchants Mapltr(h), and selected information pertaining to same, can be rendered as a display on a User Interface (UI) as seen in FIG. 24.

Process 100 moves to step 116 at which, for each merchant Mapltr(h), information is selected regarding the A/P that is owed by the business (or the funds to be spend on a Purchase Order (PO) for that merchant), and that selected information is sent out for delivery to merchant Mapltr(h) at steps 118. Note that steps 116-118 correspond to steps 2204-2206 seen in FIG. 22 as explained below. Further, and by way of non-limiting example, one or more merchants Mapltr(h) displayed on the UI seen in FIG. 24 can be selected by user input to the UI. Thereafter, each selected merchant Mapltr(h) can be transmitted a request to accept payment of an amount due (A/P) by Corporate Card (CC). If the merchant Mapltr(h) agrees and responds to the request, the merchant will also for an optional incentive selected by user input to the UI, where incentive could be included in the request sent to by the merchant Mapltr(h). Note that the process of the transmitted request and its response as given in these examples can be implemented in the environment 2300 depicted in FIG. 23 as explained below.

FIG. 2 is an exemplary user interface into which data entry is made on the same line as text descriptive of the particular data to be entered. This data entry display screen is used in a tool that helps a business to automate its analysis of what kind of payment method should best be made to its suppliers. This tool will help identify, using the data entry, those savings opportunities available to the business by paying those suppliers to the business using a Corporate Card (CC) (i.e., a debit or credit card). Hereinafter, payments with a debit card, credit card, a prepaid card, or a stored value card are referred to as payments on account. In particular, the business will have been issued the account upon which such payment is made by an issuer, such as a bank or other financial institution. A payment processing system involving such issuers and account holders having been issued accounts, as well as the merchant being paid and their respective acquirers, will be discussed with respect to FIG. 25.

The tool for being used for processing data entries relative to FIG. 2 helps to identify cash and check spending that a business is using to pay its suppliers and merchants. Also, the tool shows what process savings can be realized by changing a business practice from payments with checks and cash to payments on account. Moreover, the tool estimates the financial benefits of migrating identified payments to specific suppliers to payments by use of a debit or credit card.

Using an estimated cost saving for each transaction that a business pays with a credit or debit card as opposed to a check or cash, computations can be made for a return on investment, as well as cost of capital, which computations are used for various calculations. For instance, one variable that can be used is the number of days that a check is payable as opposed to paying on account. Other ongoing administrative costs are also consider as seen in FIG. 2. In using the data entry with this tool, savings can be estimated for what a business can realize by migrating all of its cash or check payments to suppliers of the business who will accept a debit or credit card. The return on investment for such a conversion is estimated, by way of a report generator that shows in such reports the net savings that the business can achieve at each of different number of years. For instance, a business may not be able to migrate all of its target transactions with merchants from cash or checks to a credit or debit card payment within a first year, such that a two or three year projection will be a better estimate of the savings that can be realized. Accordingly, the report may show one, two and three year horizons throughout which saving can be realized by converting from check to debit or credit card payments.

At reference numeral 202 in FIG. 2, a data entry clerk can choose one of two different options that will be used to derive cost savings using this tool. In particular, if the first option is selected, a direct estimate can be input as to what the cost of writing a check would be as the cost of paying for a transaction that a business has conducted with a merchant. Alternatively, as seen by Steps 1 and 2 of FIG. 2, the data entry clerk can input more precise data for a determination of the actual cost of paying by check. As seen at Box 204 in FIG. 2, the hourly wage of people involved in paying accounts payable is input into the user interface of the data entry tool. At Box 206 of FIG. 2, other information is input in order to determine the costs of ordering supplies from a supplier that a business is using. The information seen at Box 202 is minimalist and other information more directly related to the costs of ordering supplies could also be added to this section of data entry fields. Nevertheless, reference numeral 206 shows data entry fields which serve to illustrate the types of costs that could be involved in ordering supplies from a supplier (i.e., a merchant). Note that Box 206 corresponds to information collected at step 1904 of FIG. 19 which is an expansion upon step 102 in FIG. 1.

FIGS. 3*a*-3*b* are steps 3 and 4, respectively, of data entry field sets used to calculate more specific information about the costs of a business paying suppliers with a check as opposed to paying with a debit or credit card. At step 3, seen in FIG. 3*a*, reference numeral 302 shows data entry fields that are requested to be entered about a particular business's check payment process. The total fee per check is entered as well as the total payment cost as a sum of those data entry fields seen at reference numeral 302. At step 4, corresponding to reference numeral 308, data entry is made about the business's purchase orders and the payment information used with respect to payments to suppliers of the business. As seen in reference numeral 310, the total card purchase and payment cost is illustrated as derived from the factors of all the fields seen at reference numeral 308. As such, steps 3 and 4, as well as steps 1 and 2, are used for calculating those costs associated with the business in paying its suppliers. Note that Box 302 corresponds to information collected at step 2002 of FIG. 20, and that Box 304 corresponds to information collected at step 2004 of FIG. 20, which boxes are an expansion upon step 102 in FIG. 1.

Figure 4:
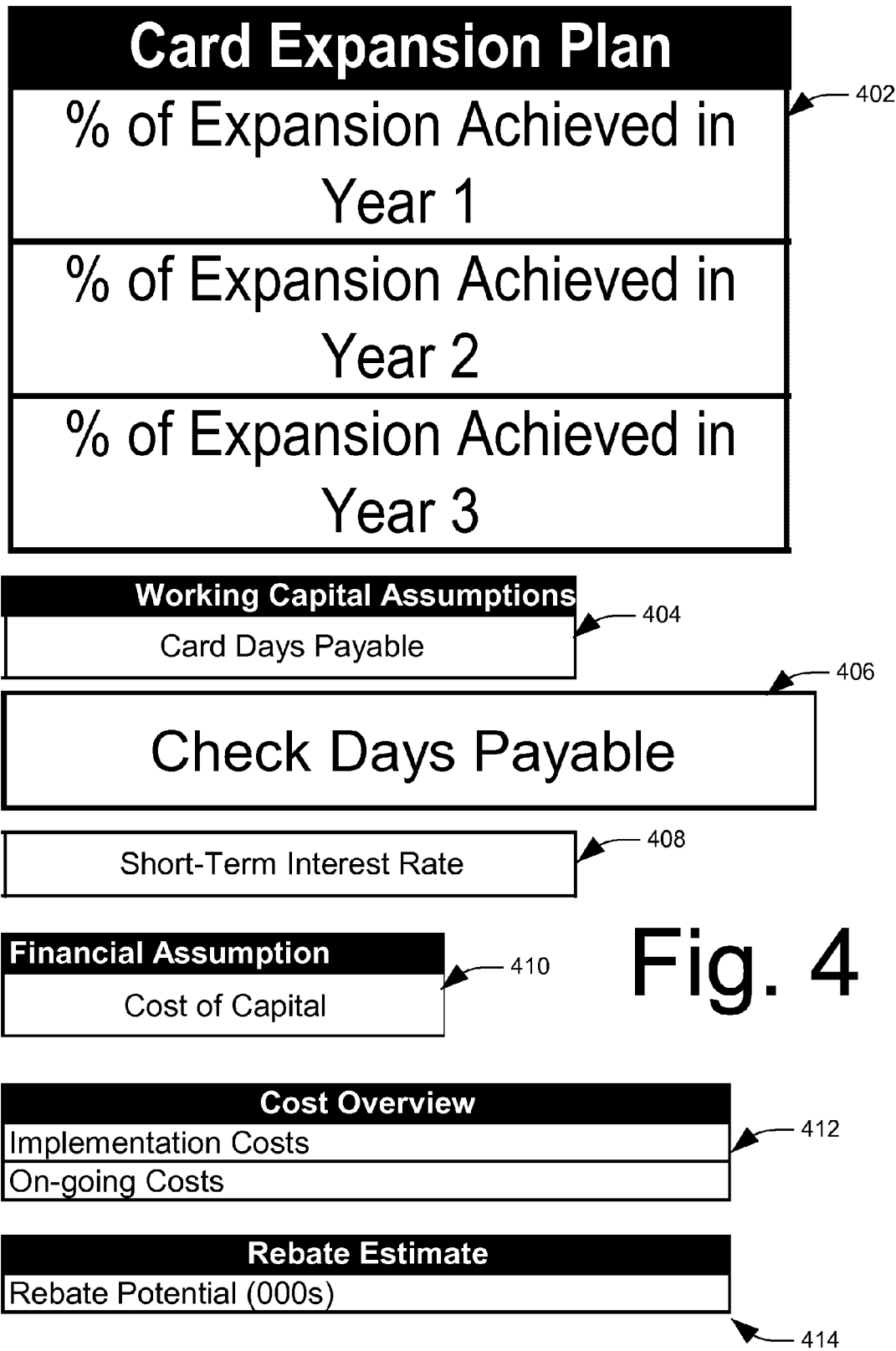
FIG. 4 illustrates additional information used to calculate opportunity cost.

FIG. 4 shows additional information that is used and received by way of data entry in order to calculate the opportunity cost for a business converting from the method of paying its suppliers by check to a method of payment by debit or credit card. At box 402, a clerk may input in each of three tiers the percentage of the business's payments that the business would like to extend from paying with check for transactions to paying with a debit or credit card in those transactions. Stated otherwise, the percentage of the card expansion opportunity may be identified, which can be captured from each of three consecutive years. At box 404, an assumption is input as to working capital, for instance, the working capital assumption may be the impact that paying with a credit card may have on working capital costs. For this, data entry can be made to provide the average days payable by the payment method, whether by check or by corporate card, as well as a short term interest rate. At box 406, the number of days payable for a check (or other non-corporate card payment method) is input. At box 410, an input is made as to the cost of capital, which is generally an estimated assumption. The cost of the capital can be used to calculate the net present value of moving to credit card payments as a measure of the opportunity for doing so. The estimated savings realized by conducting a credit card transaction, as opposed to payment by a non-corporate card method, can be used as a benchmark in this tool. Box 410 corresponds to information collected at step 2008 of FIG. 20, "Consider Net Present Value Of:".

At box 412, input can be made for one or more years as to the cost to implement a credit card payment program and doing away with a previous non-corporate card payment method program (i.e., a check payment program). The ongoing costs of maintaining such an implemented credit card payment program can also be assessed for each of one or more years. At box 414 of FIG. 4, it can be estimated, for each of several years, what a potential annual rebate will be if a business pays its suppliers with a credit card as opposed to a check. In this case, the issuer of a corporate card to the business may by the business a rebate because the issuer welcomes such payment by corporate card over payments by check. As such, the total anticipated card volume may be used to measure the potential annual rebate realized. Box 410 corresponds to information collected at step 2006 of FIG. 20.

FIG. 5 shows at reference numeral 500 an optional information display or other output which can be used in by a clerk in a data entry session at a user interface to see still further information about a business' past history of paying its suppliers with credit cards or payments with cash or checks (i.e., in general, payment by non-corporate card methods). As such, the information received is the amount of monthly purchasing that a business typically does with its suppliers using a credit card. If cards are distributed to several card holders for use within a business, the average monthly spend of each such card holder is estimated. Also estimated is a number of transactions that is conducted by each card held by each card holder within the business. The average transaction amount of each card transaction is input as well as the number of card holders to employees in that business. Also, the percentage of active cards that are being used each month to make credit card purchases by the business is another measurement that may be input by the clerk for any particular month. Also, the percentage of transactions, large or small, that are made by using a credit card of the business may also be a factor as seen in FIG. 5.

Figure 6:
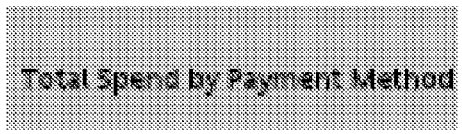
FIG. 6 illustrates exemplary data tables demonstrating payment calculations.

Given the data input in FIGS. 2 through 5, FIG. 6 shows the result of calculations that may be made using the foregoing as well as other data entry in order to allow a business to assess their accounts payable and the relative merits of migrating to a commercial card payment method program to pay its suppliers as opposed to paying by other than a corporate card (i.e., Electronic Funds Transfer (EFT), wire transfer, check, cash, etc.) As such, FIG. 6 shows a report of the total money being spent by each payment method of a business. In this case, the business is the "ABC Company." All methods of payment are shown here as well as all categories of payment. In this case, the credit card that is being used as a corporate card is a Visa card as seen in the upper right hand corner of FIG. 6 near reference numeral 600. As shown in FIG. 6 is an annualized spend by each payment method as depicted for this ABC Company. In particular, the payment methods reflected are payment by check, by wire transfer, by EFT, by corporate card, and payment by a check or "ACH." In this case, an ACH payment differs from a check payment by an electronic clearing and settlement system for exchanging electronic transactions among participating depository institutions, such as electronic transactions which are a substitute for paper checks. Typical of ACH payments are payroll and loan payments, and are typically recurring payments that are not done with paper checks but are rather done through electronic transactions. Also seen in FIG. 6 are payments made by way of purchase orders to suppliers and the payment method being used as measured by the historical data of the ABC Company. The last category seen in FIG. 6 is the annualized spend to suppliers for whom purchase orders are not used and the respective payment method used to pay those suppliers. A grand total for each of the foregoing four (4) categories of payments and methods thereof are shown in the report illustrated in FIG. 6.

Figure 7:
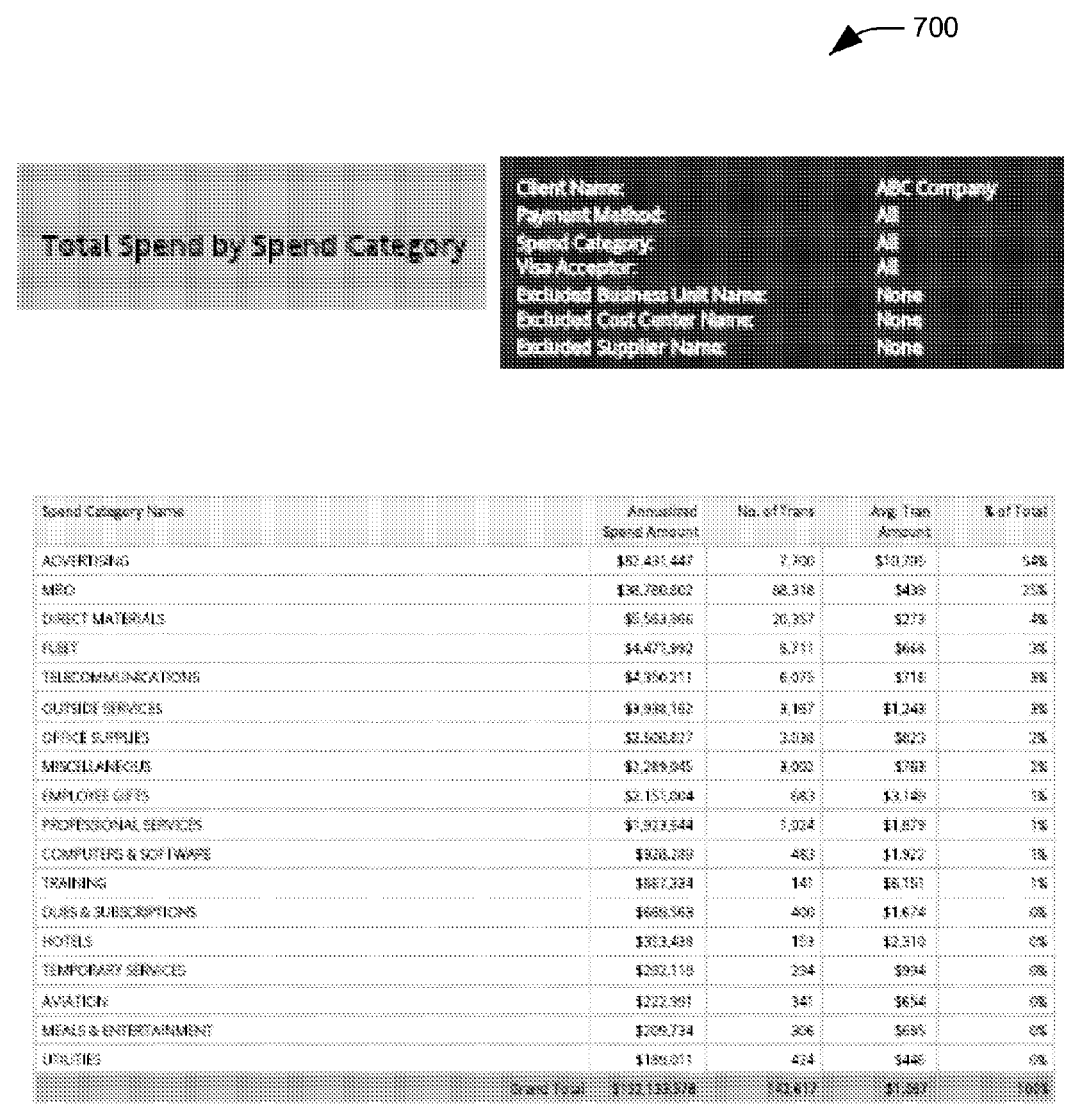

FIG. 7 shows, at reference numeral 700, the total funds spent by the ABC Company for each of several categories of suppliers from whom it purchases goods and services. In particular, categories of suppliers to the ABC Company include advertising, fleet services such as automobile fuel and mechanics, telecommunications, computer and software, trainings, etc. A grand total for each such category of spending by the ABC Company is also shown.

FIG. 8 shows, at reference numeral 800, an abbreviated report of the total spending by the ABC Company by way of category as well as payment method. In particular, the particular categories illustrated are seen in the far left hand column, and particularly are shown, albeit abbreviated, as advertising, direct materials, etc. For each such category, the total payment by electronic payment (ACH), corporate card, check, electronic funds transfer, and wire transfer are also shown. A grand total is also seen for each such category.

Of course, the reports seen in FIG. 8 could be expanded for numerous categories of payments to suppliers by the ABC Company, as well as for totals for each such category. By way of example of report similar to that seen in FIG. 8, one report for the ABC Company can be the top suppliers to ABC Company that are currently being paid by a corporate card. In such a report, each of the merchants that are supplying the ABC Company would be listed as well as the annual amount of spend with the corporate card, the number of transactions being conducted by the business with the merchant, and the average amount of each such transaction. In further expounding upon FIG. 8, graphical depictions of annualized spending with a corporate card versus annualized spending for check payment suppliers to the ABC Company can also be depicted. As such, it can be graphically depicted as to the amount of spending with non-acceptors of corporate cards as well as the amount of spending with suppliers to the business ABC Company that do accept corporate cards.

FIG. 9 shows, at reference numeral 900, the amount of "cardable" spending being done by ABC Company as listed by the category of the spending as well as a policy tier. In this case, the categories are as represented previously in FIG. 8, where the policy tier is a dollar range that is authorized for spent for each transaction, and particularly is expressed as being zero to $2,500, $2,500 to $5,000, $5,000 to $20,000, and a grand total of the foregoing. For each such policy tier, the annual amount of spending, the number of transactions, and the percentage of cardable spend is listed for each category. Totals are rendered accordingly for such a report, although not shown in FIG. 9. This report can be further expanded (not shown) for each of several policy tiers, meaning the amount of money that is being authorized to be spent using several different levels of spending. A grand total can be listed for each such policy tier for each of the categories for each of the merchants as well as a grand total across all policy tiers in those categories for each such merchant and across all merchants.

FIG. 10 shows at reference numeral 1000 a proposed report that lists the cardable spend by ABC Company for those suppliers that supply ABC Company, and who also accept a corporate card, such as a debit card or credit card. For each such supplier to the ABC Company, a report is made as to the annualized amount of money spent with the supplier, the number of transactions conducted with that supplier, as well as the average transaction amount for that supplier. As such, FIG. 10 represents a report of those suppliers to the ABC Company who are currently being paid with check though the supplier will actually accept a corporate card (in this case, the 'Visa card'). In particular, the report seen in FIG. 10 can be a listing of the top suppliers to the ABC Company, such as the top 75 suppliers, the top 100 suppliers, etc. As used herein, the phrases "cardable" and "cardable payment method" are intended to mean a payment that is being made with something other than a corporate card (i.e., cash or check). Alternatively, a cardable method may also include an electronic funds transfer (such as wire transfer, EFT, or ACH).

FIG. 11 shows at reference numeral 1100 a proposed report for the tool described herein which represents a comparison of suppliers being paid by the ABC Company via a corporate card versus payments that were made by something other than a corporate card. Each supplier is listed under a label such as "supplier". For each such supplier, the annualized amount of money being spent by the ABC Company on the supplier is listed. Also listed is as the number of transactions and the average amount of each such transaction. Further listed for each supplier is the annualized amount that is not being paid with a corporate card, the number of such transactions and the average transaction amount for payments made by the ABC Company to the supplier that are not being made by a corporate card. At reference numeral 1102 in FIG. 11, yet another proposed report is seen. This other report is again characterizing the business practice of the ABC Company in its total spend by business unit and the method of being paid. In particular, two different business units are depicted at reference numeral 1102, namely the ABC Corporate Business Unit and the Finance Department. For each of these two business units, the payments using each of four different payment methods are seen. In particular, those payment methods include ACH, card, check, and EFT. For each such payment method, two numerical computations are reported. For each payment method there is listed the annualized spend amount and the percentage of the business units spend. As such, the information is listed as to how much money is being spent by the business in each of the payment methods. It is further seen that the two business units' highest method of payment are by check as depicted below reference numeral 1102 in FIG. 11. The report 1102 may be used to demonstrate, mathematically, that show the two business units can increase their spending in corporate cards and decrease their spending in checks if the goal is to make the spending method more even across those categories.

FIG. 12 shows at reference numeral 1200 a report which may be titled "Cardable Spend with Suppliers Who Do Not Accept Payment By Corporate Card." In particular, this report can show, for each of several suppliers to the ABC Company, each supplier's annual spend amount that is being spent by the ABC Company to the supplier, the number of transactions use to spend that amount, and the average amount of each such transaction. As such, report 1200 shows all the suppliers to the ABC Company who do not currently accept a corporate card (also known as a 'commercial card') for payment of transactions from the ABC Company. The report 1200 can show the top 75 suppliers (or another number) so that the best of the group can be quickly illustrated to the ABC Company when considering whether to convert each such supplier to a corporate card payment or to remain in the mode of paying the supplier by check or other non-corporate card payment method. At reference numeral 1202, in FIG. 12, another report is listed showing the cardable transactions with suppliers to the ABC Company who do not currently accept a corporate card. In particular, one supplier is shown, namely "Professional Screen Printing Inc." For this supplier, a list is made of the annualized spending amount, the number of transactions that ABC Company conducted with the supplier and the average transaction amount. Of course, many other such suppliers to the ABC Company could be listed on the report 1202 which has, for brevity purposes, been shortened in this report 1202.

Reference number 1204 in FIG. 12 shows a report of the potential commercial card accepting suppliers by the amount of money being spent. In particular, this report is meant to illustrate those suppliers to the ABC Company who could be paid with a corporate card but are currently not being paid with the corporate card. Rather, the report 1204 shows those suppliers that are being paid by check but otherwise would accept a corporate card payment. In particular, the top 75 suppliers might be listed, discretionarily, in report 1204. For each such supplier, the annualized amount of money being spent by the ABC Company with the supplier is shown, as well as the number of transactions conducted with that supplier, as well as the average amount of each such transaction. As such, report 1204 shows, at a glance, the likely suppliers who would be willing to accept a corporate card payment, as well as the amount of money and the number of transactions being spent with that supplier.

FIG. 13 shows at reference numeral 1300 a proposed report which illustrates the potential suppliers that would accept a commercial card (i.e., a corporate card) from the ABC Company but are currently being paid by check, where the report 1300 shows for each such supplier, the annualized spend amount which is the amount of money being spent with the supplier by the ABC Company, the number of transactions being conducted by the ABC Company with the supplier, as well as the average amount of each such transaction.

Given the foregoing information, a graphical depiction, such as a pie chart, can be rendered on a report that shows a summary of all the foregoing supplier data, thereby allowing the view of such graphics to quickly reflect upon the ABC Company as to the number of companies that are suppliers to the ABC Company but are not accepting a commercial card, as well as the number of suppliers that are supplying the ABC Company that do accept will a corporate card. If information is being collected about each such supplier includes the quality of information being captured by the supplier for transactions, this information can also be graphically depicted to the ABC Company in another report (not shown). For example, the quality of information can include 'level one' data which is basic transactional data, 'level two' data which can include data related to taxes and tax implications, and 'level three' data can include product level data such as SKU data.

As seen in FIG. 13 at reference numeral 1302, a comprehensive information list can be made for each supplier of ABC Company. In particular, information given about each such supplier to the ABC Company includes whether or not that supplier accepts a commercial card, whether or not the level two and three data are being supplied by the supplier, the annualized spend amount that ABC Company makes with the merchant, the number of transactions with that merchant, the average transaction amount with the supplier, the amount of money being spent with the supplier that could have been spent using a corporate card, the amount of money that actually was spent with the supplier using payments with a corporate card, and the amount of money being spent with the supplier using a method other than a corporate card method. As such, report 1302 is titled "Supplier Reference."

Given the information received and reported on in the previous figures, FIGS. 14-15 show a financial benefit summary report. FIG. 14 shows a report at reference numeral 1402 detailing the financial benefits summary of the foregoing information. In particular, report 1402 demonstrates that the expansion of a corporate card program can provide significant annual processing savings to the ABC Company. As shown in reference numeral 1404, a report is made of the current performance by volume and transactions, as well as the opportunity increase by volume and transactions. Thus reference numeral 1404 in FIG. 14 points to a portion of the report which details the total projected savings for several categories. Those listed categories, and summaries for each, include the number of additional card transactions that could be made to suppliers of ABC Company, the purchase and payment process savings for each such transaction. Also shown is the savings opportunity which is depicted as the number of transactions being processed and the savings for each such processing.

FIG. 15 represents an expansion and further report of the abbreviated reports seen in FIG. 14. In particular, FIG. 15 includes several categories at reference numerals respective to those seen in FIG. 14. As shown in the report at reference numeral 1502 in FIG. 15, the total savings opportunity is $2,938,215. As such, the current savings on the ABC Company's current card program is about $1.5 million. Thus the total process savings, which includes both current savings and savings opportunity, is about $4.5 million.

At reference numeral 1504 in FIG. 15, a report is shown which is titled "Commercial Card Expansion Return on Investment." Reference numeral 1506 shows, for the payments of suppliers by check, what return on investment might be achieved for an annual spend amount for payments in the zero to $2,500 category as well as the number of transactions in this category and the average amount of each such transaction as well as transactions in two other categories with grand totals for each such category. Moreover, reference numeral 1506 shows the grand total for each annualized spend amount across all categories, the total amount of transactions for all policy tier categories and the average amount of transactions across all policy tiers.

Reference numeral 1508 shows assumptions about working capital that have been made in arriving at the foregoing totals. In particular, the assumptions shown in report 1508 include an assumption that each check is payable in approximately 30 days, each corporate card payment is due in about 20 days, and a short term interest rate of 5% is assumed. Reference numeral 1510 shows a report of assumptions of financial matters particularly that the cost of capital is about 12% and there's an approximate savings on each card transaction that is not paid by check in the amount of about $35.

Reference numeral 1512 on FIG. 15 shows a cost of implementing or expanding a corporate card program to replace a check payment program or other payment program. In particular, categories for a current year are depicted including the cost of such implementation, ongoing costs, working capital costs and the total cost of ownership which is the sum of the foregoing costs. Although abbreviated, report 1512 can be expanded to include not only the current year but also additional years as well. As such, the cost over several years of expanding a corporate card program can be viewed in the report 1512.

Figure 16:
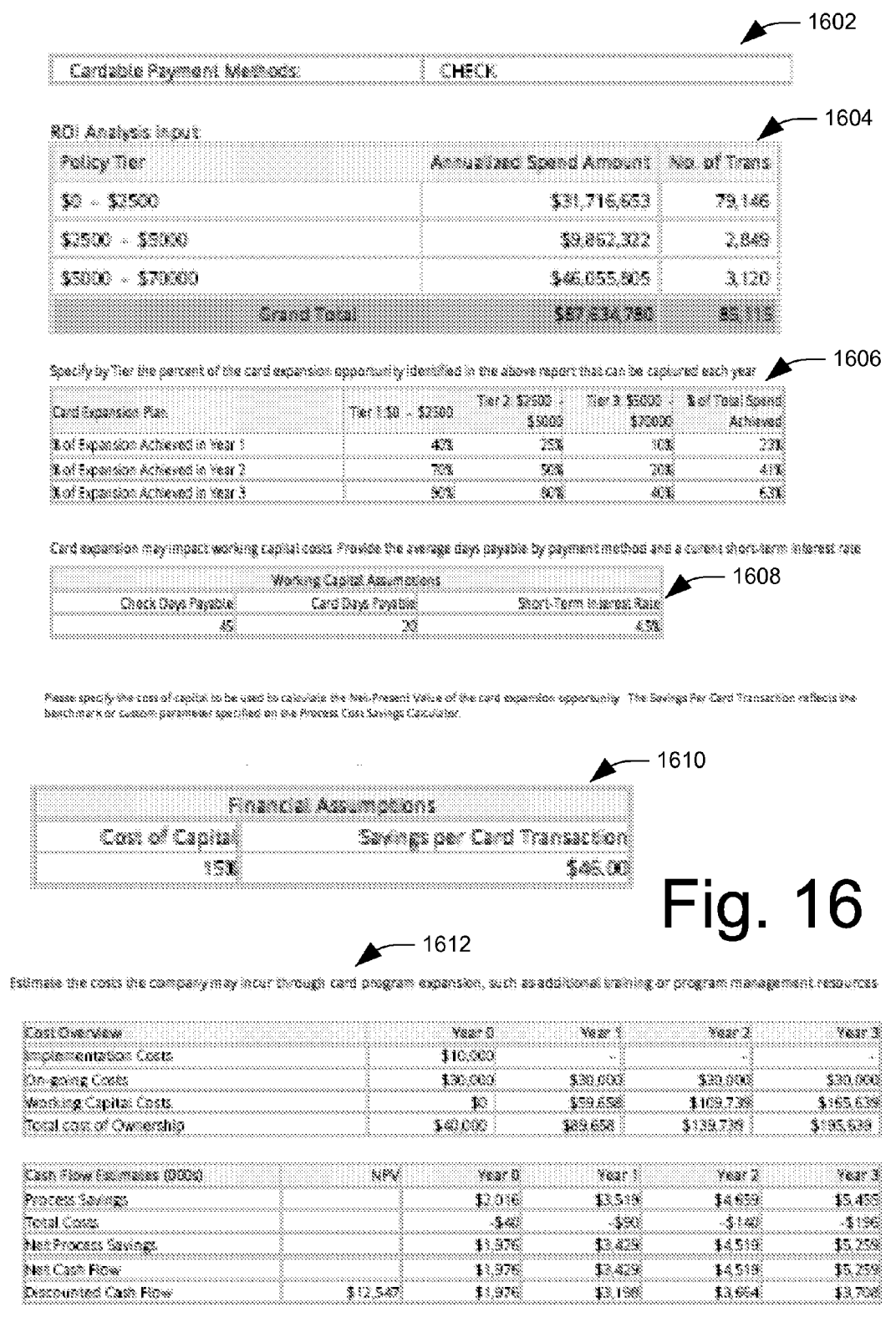

FIG. 16 shows a report for check payments which could be paid by a corporate card as seen at reference numerical 1602 "Cardable Payment Methods". Reference numeral 1604 shows a Return on Investment analysis figures for each of several policy tiers by dollar and transaction amounts. Reference numeral 1606 shows card expansion figures. Reference numerals 1608 and 1610 show, respective, working capital and financial assumptions being used. Reference numeral 1612 shows a cost overview report and a cash flow estimate report, both being forecasted over several years and giving respective totals.

FIG. 17 shows at reference numeral 1700 a report titled "Commercial Card Expansion Return on Investment." Here, for a current year, the cash flow estimates are made for both net present value as well as the current year. As shown, process savings, total costs, net process savings, net flow, and this kind of cash flow are each seen for the return on an investment by way of estimates as detailed above. Reference numeral 1702 shows another report which details the cardable spend by category and by policy tier for each of several suppliers to the ABC Company. For each such supplier, in this case for one policy tier from zero to $2,500, the respective annualized amount spent and the number of transactions are shown. The depicted categories include advertising, fleet, meals and entertainment, etc.

Given the foregoing information, the ABC Company can receive graphical reports (not shown) which illustrate card volumes and the potential for expansion on the return of investment from moving to a corporate card program from payments by check and other non corporate card methods, the number of transactions that might be used in each of several years for corporate card payments in lieu of other payment methods as well as the net process savings from transitioning, year by year, from non corporate card payments to corporate card payments. FIG. 16 shows a report at reference numeral 1700 titled "Commercial Card Expansion Return on Investment." This report shows, for the ABC Company, an estimated return on investment given a cash flow estimate depicted in reference numeral 1700. In particular, for the current year and the net present value, various statistics are given including process savings, total costs, net process savings, net cash flow, and discounted cash flow. At reference numeral 1702, the cardable spend by category and policy tier are given for several different categories, and the first tier is depicted in FIG. 17 at reference numeral 1702. Of course, other such policy tiers of higher dollar ranges could also be listed for the report 1702.

FIG. 18 shows several reports which detail information about suppliers (i.e., 'A1 Auto Maintenance' and 'Hower Wholesalers') to the ABC Company. At reference numeral 1802 a series of headings are listed for the report. In particular, a merchant that is a supplier to the ABC Company is listed under the first heading of "Visa Merchant." These merchants are seen at reference numeral 1806, "Commercial Card vs. Cardable Spend for High-Ticket Acceptors", under "Supplier Name." Also listed in column headings at reference numeral 1804 are these categories: (i) "NAIC," which is a category of merchants relative to the goods and services being marketed by the Visa merchant; (ii) whether that merchant accepts a Visa card; (iii) a level of data capability and the quality thereof; (iv) the quality of the level three data (or level one or level two data) that the merchant can pass; (v) whether the merchant is a high-ticket acceptor; (vi) the socio-economic status of the merchant (such as minority owned, veteran owned, disabled veteran owned, etc); (vii) the average card transactions accepted by that Visa merchant; (viii) the highest card transaction accepted by the Visa merchant; and (ix) the relative frequency with which the merchant accepts the commercial card as compared to other payment methods accepted by the Visa merchant.

The information given on the report 1802 under heading 1804 can be used by a business to determine whether there are certain subjective, intangible, or otherwise objective criteria that the business may use to prefer to pay the supplier with a corporate card as opposed to a non-corporate card payment method. This information can be obtained from a database 2318 of a transaction handler 2314 as seen in FIG. 23, and can be displayed to the business on a user interface, such as a user interface 2402 in FIG. 24. As shown at reference numeral 2410 in FIG. 24, each category of information, for instance or more of categories (i) through (ix), is see at Q(1), Q(2), * * * Q(3) for each Merchant M in the column at reference numeral 2404. The Accounts Payable (A/P) owed to each respective Merchant M is seen at reference numeral 2406.

Reference numeral 1806 illustrates a report titled "Commercial Card Versus Cardable Spend for High-Ticket Acceptors." At reference numeral 1806, a series of suppliers are listed, and also showing whether that supplier accepts high-ticket payments and the frequency with which the supplier accepts such high-ticket transactions. Further showing the annual spend amount for the ABC Company to the supplier, the number of transactions conducted between the ABC Company and the supplier, and the average amount of each such transaction for both card and cardable transactions. Grand totals can be given for each such category of transaction as well as totals across all categories for the ABC Company given its suppliers.

Figure 19:
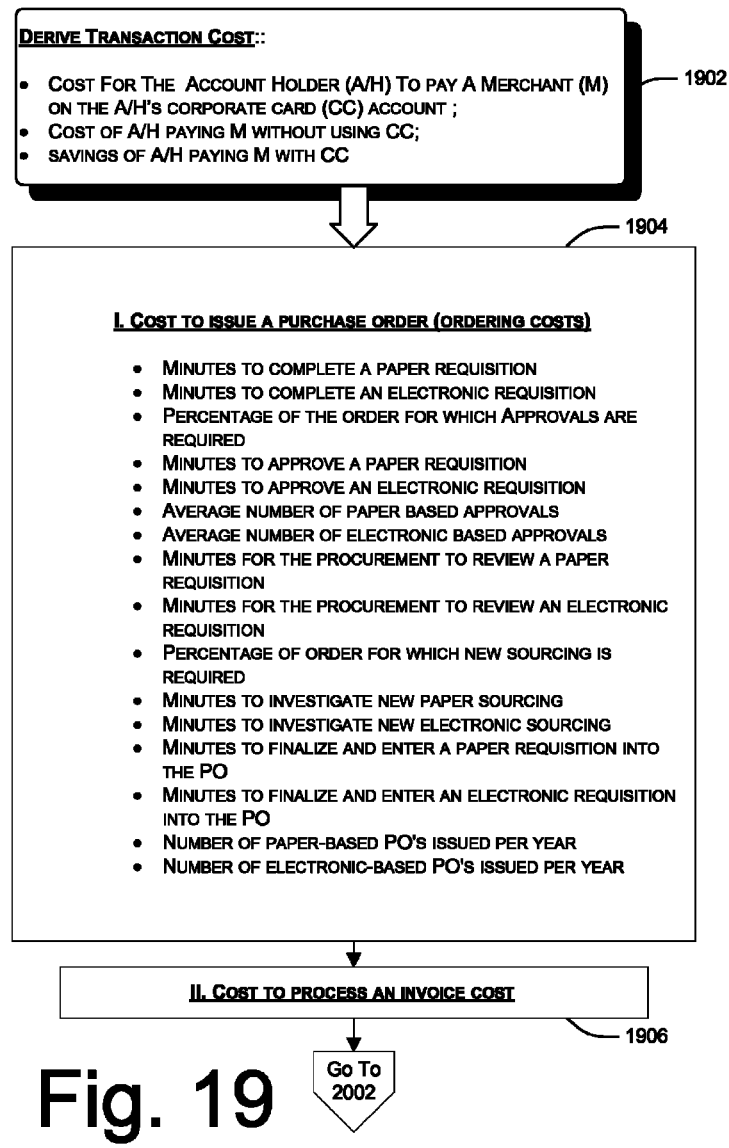
FIG. 19 represents an exemplary expansion upon a step in the process of FIG. 1.
Figure 20:
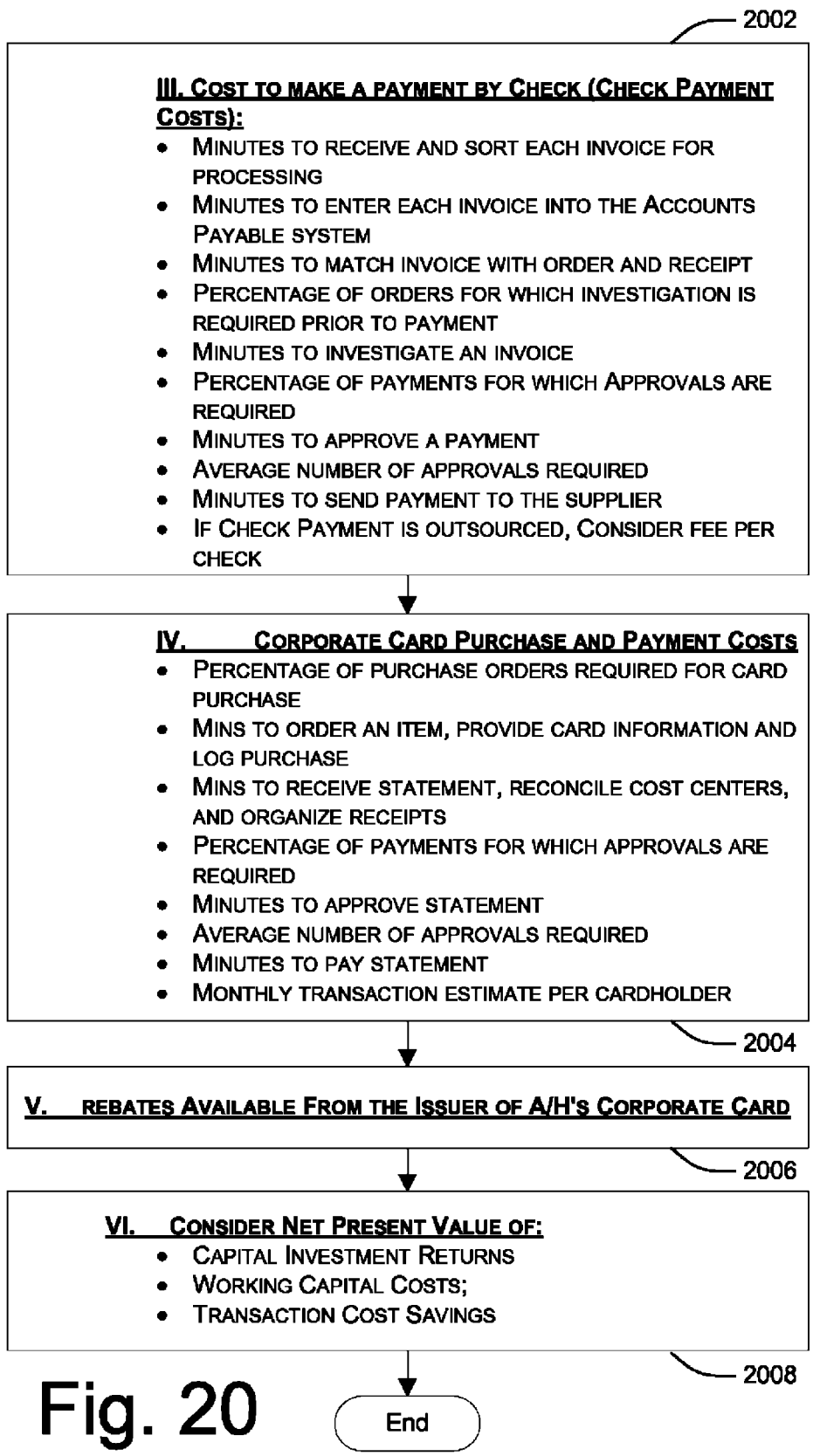
FIG. 20 represents an exemplary expansion upon a step in the process of FIGS. 1 and 19.

FIGS. 19-20 depict a process for deriving a cost per transaction for payment methodology, where the derivation corresponds to step 102 in FIG. 1, as has been further explained above with respect also to FIGS. 2, 3a and 3b, and 4. For instance, data entry fields in FIG. 4 can correspond to step 2008 in FIG. 20, and data entry field 414 can correspond to step 2006 in FIG. 20.

Figure 21:
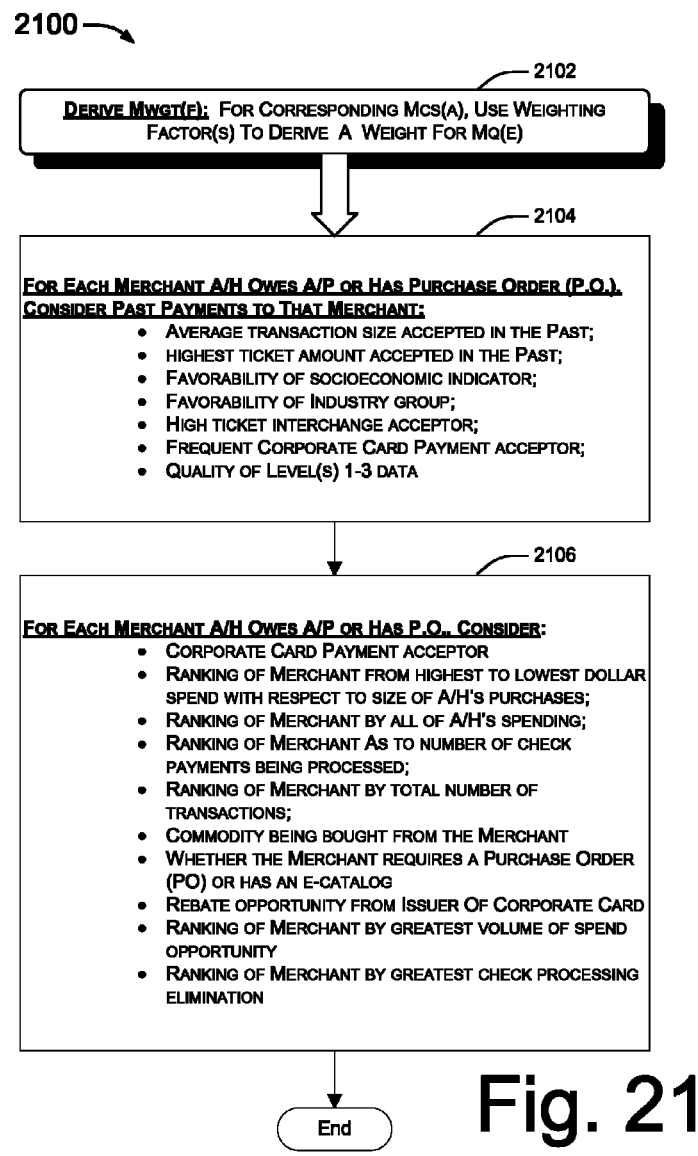
FIG. 21 represents an exemplary expansion upon a step in the process of FIG. 1.

FIG. 21 depicts a process for deriving a weighting to place upon each merchant to whom a business owes Accounts Payable (A/P). The weighting is intended to reflect the benefit to the business of paying the merchant by a corporate card as opposed to a non-corporate card payment method. The weighting for each merchant can be based solely upon objective criteria, subjective criteria, or a combination thereof. Various information can used to derive each merchant's weighting (Mwgt(f)), such as a history of past payments to the merchant that were or were not made using a corporate card, as well as each of the various information listed in steps 2104 and 2106. In particular, the information acquired in step 2104 can include:

AVERAGE TRANSACTION SIZE ACCEPTED BY THE MERCHANT IN THE PAST;
HIGHEST TICKET AMOUNT ACCEPTED BY THE MERCHANT IN THE PAST;
FAVORABILITY OF SOCIOECONOMIC INDICATOR OF THE MERCHANT;
FAVORABILITY OF INDUSTRY GROUP OF THE MERCHANT;
MERCHANTS IS A HIGH TICKET INTERCHANGE ACCEPTOR;
MERCHANTS IS A FREQUENT CORPORATE CARD PAYMENT ACCEPTOR;
MERCHANT'S TRANSACTIONS INCLUDE LEVEL 1, LEVEL 2, AND/OR LEVEL 3 QUALITY DATA.

This information about each merchant can correspond to that which is rendered at reference numeral 2410 in FIG. 24, as discussed below, where each or one or more categories is see at Q(1), Q(2), * * * Q(3) for each Merchant M in the column at reference numeral 2404.

Figure 22:
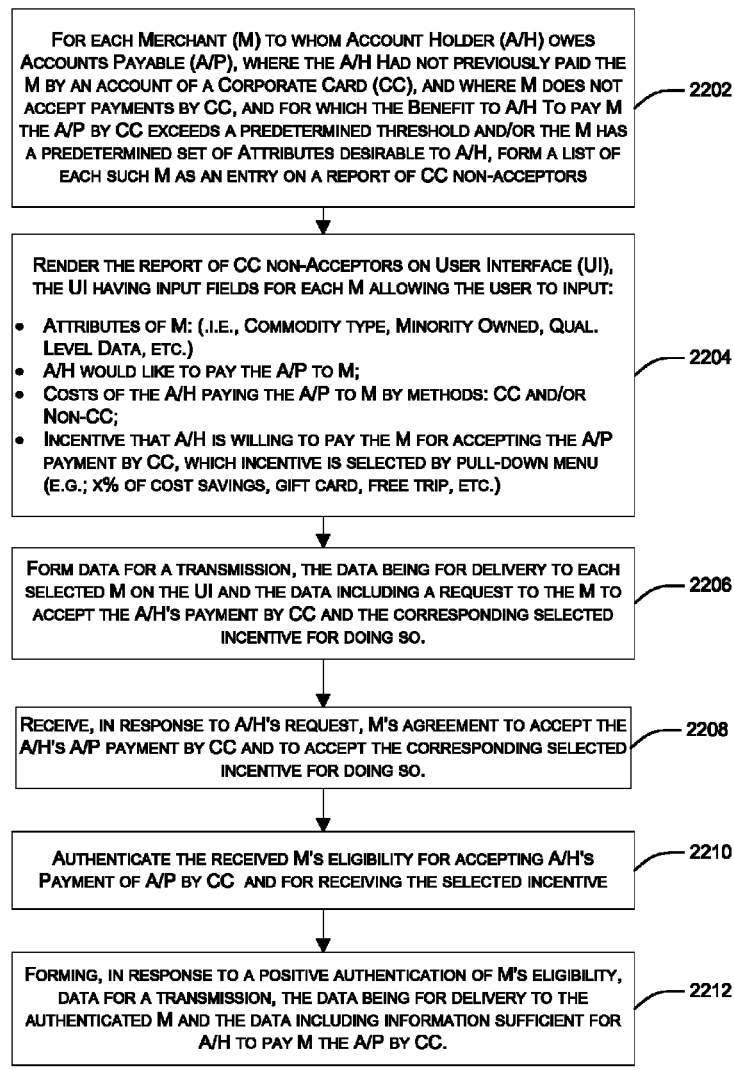
FIG. 22 is an exemplary process which can be used in conjunction with the process of FIG. 1.

FIG. 22 represents a process for identifying merchants that a business would like to pay its Accounts Payable (A/P) by a corporate card, and for following through to make such a payment with each such merchant. At step 2202, for each Merchant (M) to whom the business (Account Holder (A/H)) owes A/P, where:
  (i) the A/H had not previously paid the M by an account of a Corporate Card (CC); and
  (ii) the M does not accept payments by CC; and
  (iii) the benefit to the A/H to pay the M its A/P by CC exceeds a predetermined threshold or the M has a predetermined set of Attributes desirable to A/H;
then the a list of entries, one for each such M, forms a report of CC non-acceptors.

At step 2204 of FIG. 22, the report formed at step 2202 is rendered on a User Interface (UI) such as is seen in FIG. 24. The UI can have input fields for each M that allow a user of the UI to input:
  (i) attributes of M: (i.e., Commodity type, Minority Owned, Qual. Level Data, etc.) that would favorably influence the A/H to pay the A/P to M by CC;
  (ii) the costs of the A/H paying the A/P to the M by methods of CC and/or Non-CC;
  (iii) a user input selection of one or more incentive that the A/H is willing to pay the M for accepting the A/P payment by CC.

As shown in FIG. 24 at reference numeral 2412, an incentive can be selected from a pull down menu 2416. For instance, the user may select various incentives from the menu items of the pull down incentives menu, which are represented on the UI as codes by can include surplus percentage of the A/P, a gift card, a free trip, a percentage of the savings that the business will realize by paying with a CC without or without the rebate that the business will receive from the issuer of its CC, etc.)

At step 2206 of FIG. 22, data obtained from user input to the UI is combined with other information to form data for a transmission. These data are to be delivered to each M selected on the UI. These data will include a request to the M to accept the A/H's payment by CC and the corresponding selected incentive for doing so.

At step 2208 of FIG. 22, a transmission is received back by the business (the A/H) or its agent, in response to A/H's request. The contents of the transmission will reflect M's agreement to accept the A/H's A/P payment by CC and to accept the corresponding selected incentive for doing so.

At step 2210 of FIG. 22, optionally, the contents of the received transmission is authenticated as to M's eligibility for accepting the A/H's Payment of A/P by CC and for receiving the selected incentive. By way of example, environment 2300 in FIG. 23 can facilitate this implementation of transmissions between the card holder, a transaction processor/handler, and each merchant.

At step 2212 of FIG. 22, a response to the received acceptance from each merchant, for each merchant authenticated at optional step 2010. is sent via data in a transmission, where the data is intended for delivery to the authenticated M. The data will include information sufficient for the A/H to pay M, and the M to receive, the A/P owed to the M by the method of a CC payment.

Figure 25:
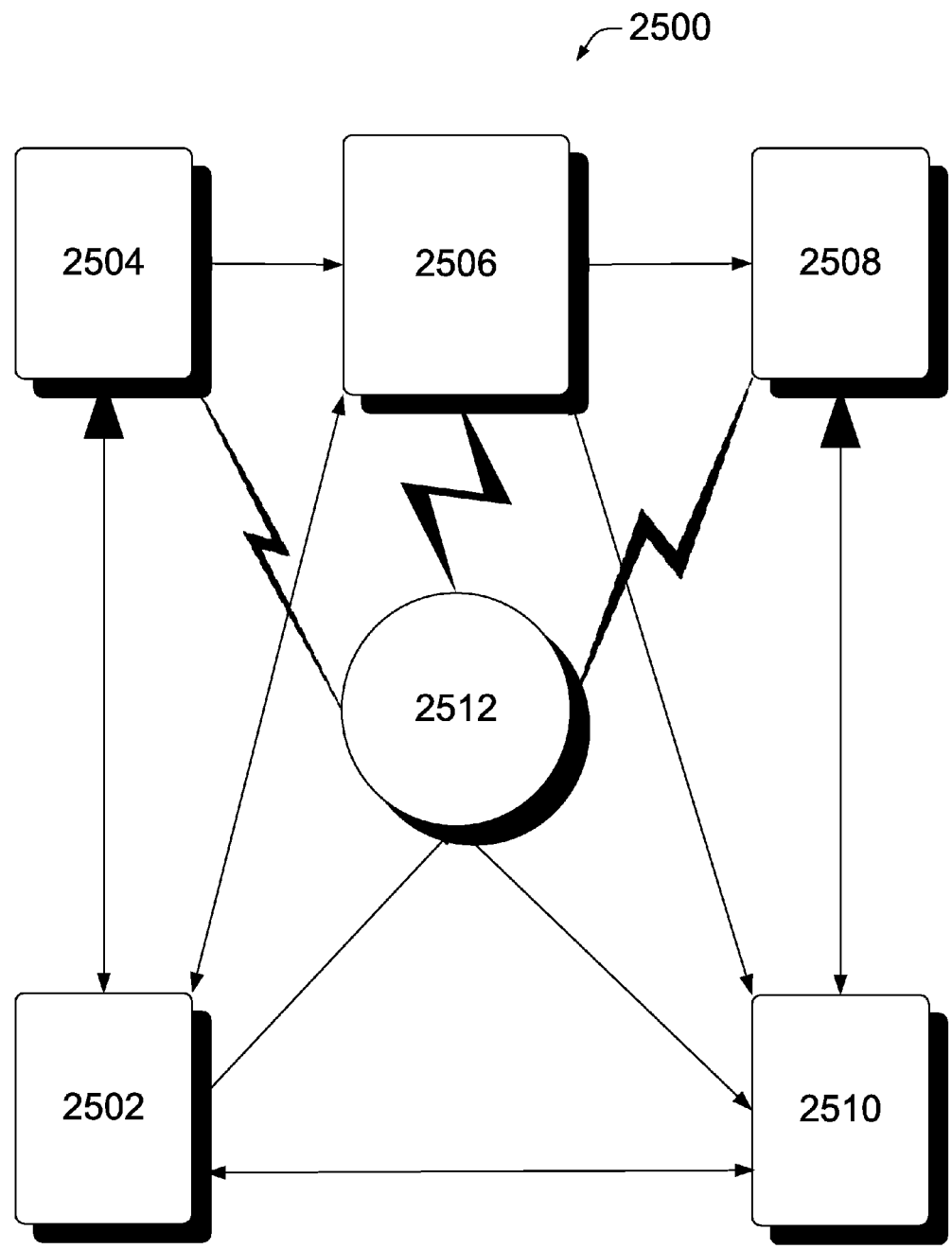
FIG. 25 illustrates a block diagram of an exemplary payment processing system within which the processes of FIGS. 1 and 23 may be practiced.

FIGS. 23 and 25 represent environments 2300 and 2500, respectively, in which the exemplary processes described here can be implemented.

Environment 2300 features a database 2302 for a business who is an account holder of a corporate card. In this logical storage are includes a database 2304 for merchants to whom the A/H has paid A/P by the A/H's Corporate Card (CC) in the past, a database 2306 of past A/P payments that the A/H made to merchants by non-CC payment methods; a database 2308 of outstanding purchase orders of the A/H to merchants; and a database 2310 of the current A/P owed by the A/H to merchants.

Reference numeral 2312 represents one or more merchants (z) to whom the A/H can use as a supplier.

Reference numeral 2314 represents one more logical storage areas of one or more transaction handlers, transaction processors, or agents thereof, where the one or more logical storage areas includes various database including a database 2316 which identifies those merchants who will accept only non-CC payment methods for one or more different types or brands of cards or products (i.e., Visa, American Express, MasterCard, Diners Club, debit cars, credit card, etc.), a database 2318 which give one or more attributes of each merchant such as one or more of the attributes seen in the box of reference numeral 2104 of FIG. 21 and/or the box of reference numeral 2204 of FIG. 22, or the displayed field 2410 of FIG. 24, and a database 2320 of those merchants who will accept A/P payments by CC.

FIG. 24 represents a User Interface (UI) for displaying merchants 2404 and respective attributes 2406-2412 thereof relative to an Account Holder (A/H), where field 2460 lists the A/P that the A/H owes to merchant M 2404, the savings 2406 that the A/H will realize by paying the A/H by their Corporate Card (CC), various attributes Q(1)-Q(3) about merchant M 2404 (see, for example, the box of reference numeral 2104 of FIG. 21 and/or the box of reference numeral 2204 of FIG. 22), a pull down menu 2416 to select there from an incentive 2412 to give to merchant M 2404 if they accept payment of A/P 2406 by CC, and a user input field 2414 as to whether to sent merchant M 2404 a letter (or like transmission) making such a request. Note that the optional selected incentive can be a surplus on the A/P, a gift card, a free trip, a percentage of the savings 2408 that the business will realize by paying with a CC without or without the rebate that the business will receive from the issuer of its CC, etc.) Note also that the optional selected incentive 2412 can be based upon one or more displayed attributes 2410 which can be subjective and/or objective attributes.

When the information for displayed on UI 2402 exceed the surface area, vertical and horizontal scroll functions (2420, 2418) are provided on the UI to view the otherwise off-screen information.

Exemplary Payment Processing System

FIG. 25 illustrates a block diagram of an exemplary payment processing system 2500 within which the processes of FIGS. 1 and 19-22 may be practiced. As will be readily understood by persons of ordinary skill in payment processing systems, a transaction such as a payment transaction in a payment processing system can include participation from different entities that are each a component of the payment processing system. The exemplary payment processing system 2500 includes an issuer 2504 such as the issuer; a transaction handler 2506, such as the transaction handler; an acquirer 2508 such as the acquirer; a merchant 2510 such as the merchant; and an Account Holder (A/H) or consumer 2502 such as the consenting consumer. The acquirer 2508 and the issuer 2504 can communicate through the transaction handler 2506. The merchant 2510, such as the utility provider, may utilize at least one POS that can communicate with the acquirer 2508, the transaction handler 2506, or the issuer 2504. Thus, the POS is in operative communication with the payment processing system 2500.

Typically, a transaction begins with the A/H or consumer 2502 presenting an account number of an account (e.g., non-credit account) such as through the use of a computer terminal or a portable consumer device 2512 to the merchant 2510 to initiate an exchange for a good or service. The consumer 2502 may be an individual or a corporate entity. The consumer 2502 may be an account holder of the account issued by the issuer 2504 such as a joint account holder of the account or a person having access to the account such as an employee of a corporate entity having access to a corporate account. The portable consumer device 2512 may include a payment card, a gift card, a smartcard, a smart media, a payroll card, a health care card, a wrist band, a machine readable medium containing account information, a keychain device such as the SPEEDPASS® commercially available from ExxonMobil Corporation or a supermarket discount card, a cellular phone, personal digital assistant, a pager, a security card, a computer, an access card, a wireless terminal, or a transponder. The portable consumer device 2512 may include a volatile or a non-volatile memory to store information such as the account number or a name of the account holder.

The merchant 2510 may use an acceptance point device, such as a POS, to obtain account information, such as the indicator for the account (e.g., the account number of the account), from the portable consumer device 2512. The portable consumer device 2512 may interface with the POS using a mechanism including any suitable electrical, magnetic, or optical interfacing system such as a contactless system using radio frequency, a magnetic field recognition system, or a contact system such as a magnetic stripe reader. The POS sends a transaction authorization request to the issuer 2504 of the portable consumer device 2512. Alternatively, or in combination, the portable consumer device 2512 may communicate with the issuer 2504, the transaction handler 2506, or the acquirer 2508.

The issuer 2504 may submit an authorize response for the transaction via the transaction handler 2506. Authorization includes the issuer 2504, or the transaction handler 2506 on behalf of the issuer 2504, authorizing the transaction in connection with instructions of the issuer 2504, such as through the use of business rules. The transaction handler 2506 may maintain a log or history of authorized transactions. Once approved, the merchant 2510 can record the authorization and allow the consumer 2502 to receive the good or service.

The merchant 2510 may, at discrete periods, such as the end of the day, submit a list of authorized transactions to the acquirer 2508 or other components of the payment processing system 2500 for clearing and settling. The transaction handler 2506 may compare the submitted authorized transaction list with its own log of authorized transactions. If a match is found, the transaction handler 2506 may route the clearing and settling request from the corresponding acquirer 2508 to the corresponding issuer 2504 involved in each transaction. Once the acquirer 2508 receives the payment of the transaction from the issuer 2504, it can forward the payment to the merchant 2510 less any transaction costs, such as fees. If the transaction involves a debit or pre-paid card, the acquirer 2508 may choose not to wait for the initial payment prior to paying the merchant 2510.

There may be intermittent steps in the foregoing process, some of which may occur simultaneously. For example, the acquirer 2508 can initiate the clearing and settling process, which can result in payment to the acquirer 2508 for the amount of the transaction. The acquirer 2508 may request from the transaction handler 2506 that the transaction be cleared and settled.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

The present invention can be implemented in the form of control logic, in a modular or integrated manner, in software or hardware or a combination of both. Thus, the steps of a method, process, or algorithm described in connection with the implementations disclosed herein may be embodied directly in hardware, in a software module executed by a processor, or in a combination of the two. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The software components or functions described in this application, may be implemented as software code to be executed by one or more processors using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may also reside on or within a single computational apparatus, and may be present on or within different computational apparatuses within a system or network.

Any recitation of "a", "an" or "the" is intended to mean "one or more" unless specifically indicated to the contrary.

The present invention may be embodied in other specific forms without departing from its spirit or essential characteristics. The described implementations are to be considered in all respects only as illustrative and not restrictive. The scope of the invention should, therefore, be determined not with reference to the above description, but instead should be determined with reference to the pending claims along with their full scope or equivalents, and all changes which come within the meaning and range of equivalency of the claims are to be embraced within their full scope.

What is claimed is:

1. A method comprising:
   deriving via a processor for a business account holder (A/H):
      an account cost to pay an accounts payable payment (A/P) using an account of a corporate card for a transaction; and
      a non-account cost to pay the A/P not using the account;
   identifying each merchant to whom the A/H owes a corresponding said A/P but does not accept the corresponding said A/P upon the account;
   deriving a weighting factor for each said identified merchant using:
      the account cost;
      the non-account cost; and
      one or more past payments made by the A/H to the identified merchant;
   deriving for each said identified merchant, using the corresponding weighting factor, a benefit to the A/H in paying the corresponding said A/P to the identified merchant on the account;
   identifying a set of preferred said identified merchants via determining whether for each said identified merchant, the benefit exceeds a predetermined threshold;
   receiving a selection of one or more said merchants from among the set of preferred said identified merchants; and
   transmitting to each said selected merchant information about the corresponding said A/P owed by the A/H, wherein said information is sufficient to receive payment on the account for the corresponding said A/P.

2. The method as defined in claim 1, wherein the payment of the A/P not using the account is a payment method selected from the group consisting of Electronic Funds Transfer (EFT), wire transfer, check, Automated Clearing House (ACH), and cash.

3. The method as defined in claim 1, wherein the identifying of said each merchant that does not accept the corresponding said A/P upon the account further comprises:
   sending, for each said merchant to whom the A/H owes the corresponding said A/P, a request for delivery to a transaction handler for an acquirer of transaction for the merchant as to a status of whether the merchant accepts the payment on the account for the corresponding said A/P; and
   receiving, for each said merchant to whom the A/H owes the corresponding said A/P, a response to the request that includes the status.

4. The method as defined in claim 1, wherein identifying each merchant also comprises:
   identifying each merchant to whom the A/H has an outstanding Purchase Order (P.O.) for the corresponding said A/P.

5. The method as defined in claim 1, wherein the selection of one or more said merchants is based, at least in part, on a quality factor selected from the group consisting of:
   a category of the merchant relative to goods and services being marketed by the merchant;
   a status of whether the merchant has ever accepted a payment on an account issued by an issuer for submission to an acquirer for collection;
   for each said merchant that has ever accepted a payment on an account, the average number of said acceptances over a first predetermined period of time;
   for each said merchant that has ever accepted a payment on an account, the highest number of said acceptances over a second period of time;
   for each said merchant that has ever accepted a payment on an account, a ratio of the acceptances to non-acceptances over a third predetermined period of time;
   a quality level of data capability that is captured and passed by the merchant for a transaction with a consumer;
   whether the merchant will conduct a transaction with a consumer over a predetermined amount of currency; and
   a socio-economic status of the merchant.

6. The method as defined in claim 1, wherein the non-account cost is derived from one or more factors each of which are selected from the group consisting of:
   a cost to the A/H to issue a purchase order (PO);
   a cost to the A/H to process an invoice for the A/P;
   a cost to the A/H to pay the A/P by check;
   a negative cost to the A/H of a rebate from an issuer of the account;
   a cost to the A/H attributable to a net present value of a capital investment return; and
   a cost to the A/H attributable to a net present value of a working capital cost.

7. An apparatus comprising:
   a memory; and
   a processor disposed in communication with the memory, and configured to issue a plurality of processing instructions stored in the memory, wherein the processor issues instructions to:
   derive for a business account holder (A/H):
      an account cost to pay an accounts payable payment (A/P) using an account of a corporate card for a transaction; and
      a non-account cost to pay the A/P not using the account;
   identify each merchant to whom the A/H owes a corresponding said A/P but does not accept the corresponding said A/P upon the account;
   derive a weighting factor for each said identified merchant using:

the account cost;
the non-account cost; and
one or more past payments made by the A/H to the identified merchant;
derive for each said identified merchant, using the corresponding weighting factor, a benefit to the A/H in paying the corresponding said A/P to the identified merchant on the account;
identify a set of preferred said identified merchants by determining whether for each said identified merchant, the benefit exceeds a predetermined threshold;
receive a selection of one or more said merchants from among the set of preferred said identified merchants; and
transmit to each said selected merchant information about the corresponding said A/P owed by the A/H, wherein said information is sufficient to receive payment on the account for the corresponding said A/P.

8. The apparatus as defined in claim 7, wherein the payment of the A/P not using the account is a payment method selected from the group consisting of Electronic Funds Transfer (EFT), wire transfer, check, Automated Clearing House (ACH), and cash.

9. The apparatus as defined in claim 7, wherein the identifying of said each merchant that does not accept the corresponding said A/P upon the account further comprises:
sending, for each said merchant to whom the A/H owes the corresponding said A/P, a request for delivery to a transaction handler for an acquirer of transaction for the merchant as to a status of whether the merchant accepts the payment on the account for the corresponding said A/P; and
receiving, for each said merchant to whom the A/H owes the corresponding said A/P, a response to the request that includes the status.

10. The apparatus as defined in claim 7, wherein the identified said merchants further comprises each said merchant to whom the A/H has an outstanding Purchase Order (P.O.) for the corresponding said A/P.

11. The apparatus as defined in claim 7, wherein the selection of one or more said merchants is based, at least in part, on a quality factor selected from the group consisting of:
a category of the merchant relative to goods and services being marketed by the merchant;
a status of whether the merchant has ever accepted a payment on an account issued by an issuer for submission to an acquirer for collection;
for each said merchant that has ever accepted a payment on an account, the average number of said acceptances over a first predetermined period of time;
for each said merchant that has ever accepted a payment on an account, the highest number of said acceptances over a second period of time;
for each said merchant that has ever accepted a payment on an account, a ratio of the acceptances to non-acceptances over a third predetermined period of time;
a quality level of data capability that is captured and passed by the merchant for a transaction with a consumer;
whether the merchant will conduct a transaction with a consumer over a predetermined amount of currency; and
a socio-economic status of the merchant.

12. The apparatus as defined in claim 7, wherein the non-account cost is derived from one or more factors each of which are selected from the group consisting of:
a cost to the A/H to issue a purchase order (PO);
a cost to the A/H to process an invoice for the A/P;
a cost to the A/H to pay the A/P by check;
a negative cost to the A/H of a rebate from an issuer of the account;
a cost to the A/H attributable to a net present value of a capital investment return; and
a cost to the A/H attributable to a net present value of a working capital cost.

13. A method comprising a plurality of steps each being performed by hardware executing software, wherein the steps include:
for each merchant to whom a business account holder (A/H) owes accounts payable (A/P), where the A/H had not previously paid the merchant by an account of a corporate card (CC) issued to the A/H by an issuer, and where the merchant does not accept payments by the CC on the account, and for which a benefit to the A/H to pay the merchant the A/P by the CC on the account exceeds a predetermined threshold, forming a list of each such merchant as an entry on a report of non-acceptors of payment by the CC on the account;
rendering the report via a processor on a user interface (UI) having input fields for each said merchant to allow input to be received from a user;
receiving data input in the input fields for one or more selected said merchants on the report, wherein the received data for each selected said merchant includes an incentive to the merchant to accept a payment from the A/H by the CC on the account;
forming a transmission that includes the data, the data being for delivery to each said merchant having corresponding said input from the UI, the data including a request to the merchant to accept a payment from the A/H by the CC on the account and to accept the corresponding selected incentive for doing so;
receiving, in response to the request from the A/H, an agreement for the merchant to accept the request;
authenticating, for each said merchant accepting the request, eligibility for accepting payment by the CC on the account and for receiving the selected incentive; and
forming, in response to a positive authentication of the merchant's eligibility, information for a transmission, the information being for delivery to the authenticated merchant and being sufficient for the A/H to pay the A/P to the merchant by the CC on the account.

14. The method as defined in claim 13, wherein the rendered report of the CC non-acceptors on the UI has input fields for each merchant to allow a user to input.

15. The method as defined in claim 13, wherein each said incentive for each said merchant is based, at least in part, a quality factor selected from the group consisting of:
a category of the merchant relative to the goods and services being marketed by the merchant;
a status of whether the merchant has ever accepted a payment on an account issued by an issuer for submission to an acquirer for collection;
for each said merchant that has ever accepted a payment on an account, the average number of said acceptances over a first predetermined period of time;
for each said merchant that has ever accepted a payment on an account, the highest number of said acceptances over a second period of time;
for each said merchant that has ever accepted a payment on an account, a ratio of the acceptances to non-acceptances over a third predetermined period of time;
a quality level of data capability that is captured and passed by the merchant for a transaction with a consumer;

whether the merchant will conduct a transaction with a consumer over a predetermined amount of currency; and
a socio-economic status of the merchant.

16. The method as defined in claim 13, wherein the incentive to the merchant to accept the payment from the A/H by the CC on the account is selected via functionality of a pull-down menu on the UI.

17. The method as defined in claim 13, wherein the incentive is selected from the group consisting of:
a percentage of a cost savings of the merchant in paying the A/P by the CC on the account instead of paying by another method of payment;
a gift card;
a percentage of a rebate given to the A/H by an issuer of the CC for paying the merchant the A/P by the CC on the account; and
a combination of the foregoing.

18. The method as defined in claim 13, wherein whether the benefit to the A/H to pay the merchant the A/P by the CC on the account exceeds the predetermined threshold is derived, at least in part, by one or more factors each of which are selected from the group consisting of:
a cost to the A/H to issue a purchase order (PO);
a cost to the A/H to process an invoice for the A/P;
a cost to the A/H to pay the A/P by a method of payment other than by paying the A/P by the CC on the account;
a negative cost to the A/H of a rebate from an issuer of the account;
a cost to the A/H attributable to a net present value of a capital investment return; and
a cost to the A/H attributable to a net present value of a working capital cost.

19. A non-transitory computer readable medium storing executable software which, when executed by a processor, causes the processor to:

for each merchant to whom a business account holder (A/H) owes accounts payable (A/P), where the A/H had not previously paid the merchant by an account of a corporate card (CC) issued to the A/H by an issuer, and where the merchant does not accept payments by the CC on the account, and for which a benefit to the A/H to pay the merchant the A/P by the CC on the account exceeds a predetermined threshold, form a list of each such merchant as an entry on a report of non-acceptors of payment by the CC on the account;
render the report on a user interface (UI) having input fields for each said merchant to allow input to be received from a user;
receive data input in the input fields for one or more selected said merchants on the report, wherein the received data for each selected said merchant includes an incentive to the merchant to accept a payment from the A/H by the CC on the account;
form a transmission that includes the data, the data being for delivery to each said merchant having corresponding said input from the UI, the data including a request to the merchant to accept a payment from the A/H by the CC on the account and to accept the corresponding selected incentive for doing so;
receive, in response to the request from the A/H, an agreement for the merchant to accept the request;
authenticate, for each said merchant accepting the request, eligibility for accepting payment by the CC on the account and for receiving the selected incentive; and
form, in response to a positive authentication of the merchant's eligibility, information for a transmission, the information being for delivery to the authenticated merchant and being sufficient for the A/H to pay the A/P to the merchant by the CC on the account.

* * * * *